(12) United States Patent
Sern et al.

(10) Patent No.: US 12,432,173 B2
(45) Date of Patent: Sep. 30, 2025

(54) SYSTEM AND METHOD FOR AUTONOMOUSLY FINGERPRINTING AND ENUMERATING INTERNET OF THING (IoT) DEVICES BASED ON NATED IPFIX AND DNS TRAFFIC

(71) Applicant: Ensign InfoSecurity Pte. Ltd., Singapore (SG)

(72) Inventors: Lee Joon Sern, Singapore (SG); Divakar Sivashankar, Singapore (SG); Koh Ting Yew, Singapore (SG)

(73) Assignee: Ensign InfoSecurity Pte. Ltd., Singapore (SG)

( * ) Notice: Subject to any disclaimer, the term of this patent is extended or adjusted under 35 U.S.C. 154(b) by 238 days.

(21) Appl. No.: 18/098,308

(22) Filed: Jan. 18, 2023

(65) Prior Publication Data

US 2023/0188552 A1  Jun. 15, 2023

(30) Foreign Application Priority Data

Dec. 14, 2021 (SG) .................. SG10202113889T
Jul. 28, 2022 (SG) .................. SG10202250622M

(51) Int. Cl.
*H04L 61/2503* (2022.01)
*H04L 9/40* (2022.01)
(Continued)

(52) U.S. Cl.
CPC .......... *H04L 61/2591* (2025.05); *H04L 41/12* (2013.01); *H04L 41/16* (2013.01);
(Continued)

(58) Field of Classification Search
CPC ......... H04L 41/12; H04L 41/16; H04L 43/02; H04L 43/022; H04L 43/026; H04L 43/04;
(Continued)

(56) References Cited

U.S. PATENT DOCUMENTS

2009/0141638 A1* 6/2009 Dolisy .................. H04L 43/026
370/241
2018/0191584 A1* 7/2018 Bondar .................. H04L 43/024

OTHER PUBLICATIONS

Matoušek, Petr, Ondřej Ryavý, and Matěj Grégr. "Security monitoring of iot communication using flows." Proceedings of the 6th Conference on the Engineering of Computer Based Systems. 2019. (Year: 2019).*

(Continued)

*Primary Examiner* — William C Mcbeth
(74) *Attorney, Agent, or Firm* — Sterne, Kessler, Goldstein & Fox, P.L.L.C.

(57) ABSTRACT

This document describes a system and method for detecting the presence of Internet of Things (IoTs) from network traffic that has undergone a Network Address Translation (NAT) process, i.e., NATed network traffic, regardless of whether the network traffic comprises IP Flow Information Export (IPFIX) type of traffic or Domain Name System (DNS) type of traffic. Such a capability is crucial as the adoption rate of IoTs have increased exponentially over the past few years. In order to protect IoTs from cyber-attacks, one would first have to understand what type of IoTs are being used, and how many/how widely used these IoTs are. Once the IoT landscape has been defined, cyber defenders may then dedicate resources to identify and subsequently address vulnerabilities that may be in these IoTs.

14 Claims, 10 Drawing Sheets

(51) Int. Cl.
    *H04L 41/12*     (2022.01)
    *H04L 41/16*     (2022.01)
    *H04L 43/022*     (2022.01)

(52) U.S. Cl.
    CPC ........ *H04L 43/022* (2013.01); *H04L 63/1425* (2013.01); *H04L 63/1433* (2013.01)

(58) Field of Classification Search
    CPC ............. H04L 61/2571; H04L 63/1408; H04L 63/1425; H04L 63/1433; H04L 61/2591
    See application file for complete search history.

(56) References Cited

OTHER PUBLICATIONS

Meidan, Yair, et al. "A novel approach for detecting vulnerable IoT devices connected behind a home NAT." Computers & Security 97 (2020): 101968. (Year: 2020).*

Meidan, Yair, et al. "Privacy-preserving detection of iot devices connected behind a nat in a smart home setup." arXiv preprint arXiv:1905.13430 (2019). (Year: 2019).*

Okui, Norihiro, et al. "Identification of an iot device model in the home domain using ipfix records." 2022 IEEE 46th Annual Computers, Software, and Applications Conference (COMPSAC). IEEE, 2022. (Year: 2022).*

Pashamokhtari, Arman, et al. "Combining stochastic and deterministic modeling of IPFIX records to infer connected IoT devices in residential ISP networks." IEEE Internet of Things Journal 10.6 (2022): 5128-5145. (Year: 2022).*

Pashamokhtari, Arman, et al. "Inferring connected IoT devices from IPFIX records in residential ISP networks." 2021 IEEE 46th Conference on Local Computer Networks (LCN). IEEE, 2021. (Year: 2021).*

Sivanathan, Arunan, et al. "Classifying IoT devices in smart environments using network traffic characteristics." IEEE Transactions on Mobile Computing 18.8 (2018): 1745-1759. (Year: 2018).*

* cited by examiner

SYSTEM AND METHOD FOR AUTONOMOUSLY FINGERPRINTING AND ENUMERATING INTERNET OF THING (IoT) DEVICES BASED ON NATED IPFIX AND DNS TRAFFIC

CROSS REFERENCE TO RELATED APPLICATIONS

This application claims priority to Singapore Patent Application No. 10202113889T, filed on Dec. 14, 2021, and Singapore Application No. 10202250622M, filed on Jul. 28, 2022, the contents of both of which are incorporated herein by reference in their entireties.

FIELD OF THE INVENTION

This invention relates to a system and method for detecting the presence of Internet of Things (IoTs) from network traffic that has undergone a Network Address Translation (NAT) process, i.e., NATed network traffic, regardless of whether the network traffic comprises IP Flow Information Export (IPFIX) type of traffic or Domain Name System (DNS) type of traffic. Such a capability is crucial as the adoption rate of IoTs have increased exponentially over the past few years.

In order to protect IoTs from cyber-attacks, one would first have to understand what type of IoTs are being used, and how many/how widely used these IoTs are. Once the IoT landscape has been defined, cyber defenders may then dedicate resources to identify and subsequently address vulnerabilities that may be in these IoTs.

SUMMARY OF PRIOR ART

In recent times, there has been a huge explosion in the usage of Internet of Thing (IoT) devices. Currently, it is estimated that there are around 46 billion IoTs in the world and by 2025, this number is expected to increase to 125 billion. As the adoption rate of IoT devices increases, this results in the discovery of new cyber vulnerabilities that target such devices. Unfortunately, it was found that IoTs are more vulnerable to cyber-attacks than general purpose IT devices and this is due to the lack of security measures embedded within these resource constrained IoT devices.

The vulnerabilities found in IoTs have resulted in multiple major Internet-wide security incidents such as the Mirai botnet and the raspberry pi botnet cyberattacks. Such attacks can cause wide disruption to the Internet infrastructure via Distributed Denial of Service (DDoS) attacks simply due to the sheer volume of IOT devices. To protect IoTs against such threats, it is imperative for Internet Service Providers (ISPs) to understand and fingerprint IoTs that exist in the network. As a result, it is now a priority to ensure that proper security measures are implemented on IoTs that are frequently used by multiple organizations.

From an ISP's perspective, it is extremely hard to determine a network's IoT landscape (I.e., to identify the IoTs that are in use and how many are there). There are 2 main contributors to this problem: First, there are many different types and models of IoT devices. As a result, it is humanly impossible to define rules for every type and model of IoT in order to fingerprint every one of them. As a result, it has been proposed by those skilled in the art that machine learning techniques should be employed to address this problem. Secondly, many IoT devices are usually located within networks (e.g. home networks, office networks, etc.). As all these IoT devices would undergo Network Address Translation (NAT), these IoTs would all share the same IP address. From the ISP's perspective, only aggregated traffic would be observed. Hence, the traffic observed from any IP address then becomes a mixture and amalgamation of traffic created by the devices behind the NAT. Thus, only an opaque view of the network behind the NAT is presented to the ISP.

As a result, those skilled in the art have tried used a myriad of data comprising of Domain Name System (DNS) data, IP Flow Information Export (IPFIX) data and even PCAP data to address these problems.

One of the first methods proposed by those skilled in the art employed network packet features to identify behaviours of IoT devices. This approach showed that network flows, particularly PCAP data, can be used to identify and fingerprint IoT devices. In this approach, packet features were used to manually extract a 23 vector for each packet. This process was the repeated for several consecutive packets to extract a feature matrix, F. This feature matrix is then subsequently used to train a classifier to determine the presence of a particular device.

Results of this approach was promising as they showed the ability to classify 27 devices with an average accuracy of 81.5%. Although this approach showed the possibility of fingerprinting devices, the assumption here was that the objective was to only fingerprint IoT devices that are located within the network.

While useful for enterprise security, it does not serve the needs of ISPs, who can't simply expect that every IP belongs to a unique IoT. Rather, in NAT-ed networks, many IoTs are sharing a single IP address. The other problem faced by this approach is the collection of the set of signatures (I.e., the collection of F's) is only done when an IoT device is onboarded onto the network. As a result, an IoT may only be detected when they are onboarded onto the network. This approach has a few implications as it implies that IoTs exhibit unique behaviour when onboarded onto a network and that device behaviour during normal operations is unknown. From an ISP's perspective, it doesn't make sense to only detect IoTs when they are onboarded onto a network. ISPs would want to know of the existing devices that are currently on the network, even when these IoTs are obfuscated by the NAT.

To address the problems above, it was further proposed that payload features are also added to the feature matrix F. It was found that similar results were achieved but this approach still suffered from similar short comings as it assumes that traffic may be grouped based on each device's MAC address. As a result, this approach still does not address the problem of NAT-ed traffic.

In view of the issues faced by the existing methods, a multi-step approach was proposed by those skilled in the art. In the first stage, traffic from individual IoTs were collected. The collected traffic is then analysed using multiple heuristics to extract sequence profiles from each IoT device. Once a dictionary of these sequence profiles has been established, the same feature extraction process would then be applied to the raw traffic. A pairwise subsequence matching of the processed raw traffic with each sequence profile is then carried out. If a match was found in the sequence, the count at that time instance would be increased by 1 for the matched IoT. At the end of the process, a time series of counts for each IOT would have been generated. These can then be passed through a Convolutional Neural network to count the number of IoTs. However, this approach has a number of major downsides.

The first downside is that the extraction of sequence profiles involves significant manual and feature engineering. For example, for each IoT device, one would first need to form sequence of traffic for each protocol and port. During this process, it is hard to determine whether a new packet of traffic belongs to the previous sequence or involves a new sequence. As a result, those skilled in the art employed heuristics to address this issue. After the sequences are collected, one would need to decide how many of such sequences should be kept. The underlying issue is that some of IoT traffic comprises random user interaction with no distinctive behaviour. Thus, another large set of rules involving both heuristics and manual engineering has to be introduced to find ways and means to identify IoT traffic of significance that should be added to the database of sequence profiles associated with the particular IoT.

The second downside is that the generation of the time series of matches is extremely computationally intensive. This stems from the need to conduct pairwise comparison between the collected traffic and every sequence profile in the database for each IoT device. Furthermore, subsequence matching is done. Thus, for every subsequence, one would need to conduct pairwise matching to each sequence profile for each IoT device.

Lastly, in order to determine whether a new packet is part of the previous sequence or not, a list of features is proposed for each of the existing protocols. For example, the features associated with the TCP protocol comprises "time, protocol, direction, TTL, payload length, TCP flags, TCP window size and TCP options", while the features associated with the UDP and other types of protocol comprises "time, protocol, direction, TTL and payload length". It should be noted that of all the features proposed, most ISPs typically log bidirectional flows of time, protocol, bytes, TTL and TCP flags. Detailed information regarding protocol specific details and payload details are rarely logged. This increases the difficulty of determining whether the new packet belongs to a previous sequence or not. Thus, we note that the entire algorithm is contingent on the proposed feature extraction process, which involves extensive number of features that ISPs may not typically log and many heuristics to iteratively determine a packet belongs to a new sequence or not. This coupled with the need for pairwise matching with each extracted signature poses a scalability problem to ISP level data and a generalisability problem as the number of IoT devices increase. Simply put, it is hard to determine whether the extensive set of heuristics used to extract sequence profiles will work for new types of IoTs.

Recently, it was proposed that IoT devices may be identified from IP Flow Information Export (IPFIX) records in ISP networks. The bidirectional flow of traffic logged in the IPFIX format was analysed to determine if these flow records may be used to indicate the presence of a particular IoT or not. It was proposed that the features found in IPFIX records be passed to a classifier, such as a random forest classified, neural network or etc. to determine whether the presence of a particular IoT may be ascertained from these records.

However, this approach faced a few issues. First, as most ISPs do not typically log every single field in the IPFIX records, only the packet counts, and the octet counts may be obtained. This means that amongst all the features that may be found in IPFIX records, one would only be able to obtain 2 of them. Secondly, the classification step was carried out based on a per record basis. It was assumed that a single IPFIX flow record is equivalent to NAT-ed traffic and by building a classifier to analyse the single IPFIX record, one can effectively peek behind the NAT. While true, this method would result in a very high false alarm rate simply because of the vast amounts of flow records one may expect in ISP traffic. Even a near perfect model with a small percentage of error would have a lot of false alarms based on the number of flow records one can expect in ISP traffic.

One of the most laborious tasks in the IoT fingerprinting approach proposed above is the need to extract IoT traffic signatures. This is an especially important process as not all the IoT traffic that is collected for a particular IoT defines the characteristics of the IoT because some of it could comprise human interaction behaviours, some could comprise the random downloads of patches, synchronization, etc. In fact, some of these behaviours may theoretically be indistinguishable from other IoTs as they may share the same underlying code. Thus, such traffic should not even be used to train a classifier model lest noise and confusion be introduced to the model training process.

In addition to analysing flow traffic such as IPFIX records and PCAP data, DNS traffic may also be utilized to detect the presence of IoT devices. Those skilled in the art showed that different IoTs generate unique DNS queries to specific domains. Hence, it was proposed that Term Frequency-Inverse Document Frequency (TF-IDF) methods be utilized to extract a feature vector for each IoT device for each day. Thus, for each day and the IoT device that data was collected for, a feature vector would be produced via the TF-IDF method. These feature vectors are then collected to form a signature database for the various IoT devices. During testing, the DNS traffic would be converted to a vector via the same TF-IDF method. Following this, a cosine similarity metric is used to determine whether a particular traffic contains an IoT or not and it was found that this method works well even with NAT-ed DNS traffic data.

Although this method has its advantages, it is noted that it operates on DNS data and the features are in fact just visitation counts to domains observed in the training data whereby these features are processed via TF-IDF methods. However, it is noted that vector similarity comparison methods are not designed to generalise to NAT-ed data. For example, if multiple devices of the same IoT type are located behind a NAT, the traffic observed could be a linear combination of all the signatures that were previously collected for a single instance of that IoT device. The eventual vector may or may not exhibit high cosine similarity with each of the collected signatures. Thus, while this approach may detect different IoT devices behind a NAT, it is noted that this only works when there is only one of each type of IoT device behind the NAT.

For the above reasons, those skilled in the art are constantly striving to come up with a way to not only identify possible IoTs behind NAT-ed traffic (I.e., traffic observed from a single router, behind which may have multiple IoTs and user), but also to enumerate them to obtain an idea how many of such devices are found in the NAT-ed traffic. The identification of IoTs, enumeration of IoTs and ability to do this at scale on very large NAT-ed network telemetry is a desired requirement of those skilled in the art.

SUMMARY OF THE INVENTION

The above and other problems are solved and an advance in the art is made by systems and methods provided by embodiments in accordance with the invention.

A first advantage of embodiments of systems and methods in accordance with the invention is that based on network traffic, be it IPFIX traffic or DNS traffic, the presence of IoTs may be determined, identified and enumerated.

A second advantage of embodiments of systems and methods in accordance with the invention is that the invention may detect the presence of IoTs that have been NAT-ed whereby the detection is done based on the NAT-ed network traffic, be it IPFIX traffic or DNS traffic.

A third advantage of embodiments of systems and methods in accordance with the invention is that in relation to IPFIX flow-based traffic be it NAT-ed or not, the invention utilizes custom loss functions to train the deep neural network to detect and enumerate IoTs automatically at scale in an end-to-end manner, without the need to manually engineer or fine tune features.

A fourth advantage of embodiments of systems and methods in accordance with the invention is that in relation to IPFIX flow-based traffic be it NAT-ed or not, the invention utilizes custom loss functions to train the deep neural network in a stable, scalable, end-to-end fashion without the need to manually engineer or create human-defined features to stabilise the training process.

A fifth advantage of embodiments of systems and methods in accordance with the invention is that in relation to DNS traffic be it NAT-ed or not, linear algebra is utilized to decompose the observed traffic's vector into its constituents, in closed form, such that the IoTs may be identified and enumerated in a scalable manner.

A sixth advantage of embodiments of systems and methods in accordance with the invention is that the invention is configured to combine insights from both IPFIX and DNS traffic to generate a comprehensive IoT landscape report from which information about the IoTs used in the NAT-ed network telemetry may be obtained.

The above advantages are provided by embodiments of a method in accordance with the invention operating in the following manner.

According to a first aspect of the invention, a system for autonomously fingerprinting and enumerating Internet of Thing (IoT) devices based on Network Address Translated (NAT-ed) network traffic of the IoT devices that has been collected over a time period is disclosed, the system comprising: a grouping module for generating a database of time bins, the grouping module being configured to: retrieve IP Flow Information Export (IPFIX) records from the NAT-ed network traffic; group the IPFIX records according to their occurrence time, source Internet protocol (IP) address and destination IP address; order the IPFIX records in each of the groups chronologically according to occurrence times of the IPFIX records; generate a plurality of IPFIX data samples whereby each IPFIX data sample is generated based on the group of chronologically ordered IPFIX records, whereby each IPFIX data sample comprises a plurality of discrete time series comprising a protocol, an octet, a reverse octet, a source port, a destination port, a packet and a reverse packet that are associated with the IPFIX record having a collection time that falls within the particular time bin of the discrete time series; a trained two-headed neural network communicatively coupled to the grouping module, the trained two-headed neural network configured to: determine, using a first head of the trained neural network, identities of IoT devices that generated the NAT-ed network traffic by carrying out per device tempered binary classification on the generated data samples; and enumerate, using a second head of the trained neural network, each of the IoT devices identified by the first head of the trained neural network, whereby the first head of the trained neural network is trained using a loss model that treats labels from training datasets as noisy labels and the second head of the trained neural network is trained using a mean squared error (MSE) loss function, and whereby the training dataset used to train the two-headed neural network comprises a plurality of IPFIX training data samples generated, using the grouping module, based on unNAT-ed network traffic, and comprises a plurality of the IPFIX training data samples that have undergone a data augmentation process.

With regard to the first aspect of the invention, the loss model that treats labels from training datasets as noisy labels comprises a bi-tempered cross entropy loss function that is parameterised by a temperature term, $t_1$, wherein the bi-tempered entropy loss function is defined as $$\sum_{i=1}^{k} \left( y_i \left( \log_{t_1} y_i - (\log_{t_1} \hat{y}_i) - \frac{1}{2-t_1} \left( y_i^{2-t_1} - \hat{y}_i^{2-t_1} \right) \right) \right)$$

With regard to the first aspect of the invention, the loss model that treats labels from training datasets as noisy labels comprises a bi-tempered softmax function that is parameterised by a temperature term, $t_2$, wherein the bi-tempered softmax function is defined as $\hat{y}_i = \exp_{t_2}(\hat{a}_i - \lambda_{t_2}(\hat{a}))$, where $\lambda_{t_2}(\hat{a}) \in \mathbb{R}$ is $s.t.$ $\Sigma_{j=1}^{k} \exp_{t_2}(\hat{a}_j - \lambda_{t_2}(\hat{a})) = 1$ With regard to the first aspect of the invention, the generation of a protocol for the time bin of a IPFIX data sample comprises the grouping module being configured to: randomly select a protocol of an IPFIX record that has a collection time that falls within the time bin.

With regard to the first aspect of the invention, the generation of an Octet for the time bin of a IPFIX data sample comprises the grouping module being configured to: sum all the Octets of IPFIX records that have a collection time that falls within the time bin.

With regard to the first aspect of the invention, the generation of a reverse Octet for the time bin of a IPFIX data sample comprises the grouping module being configured to: sum all the reverse Octets of IPFIX records that have a collection time that falls within the time bin.

With regard to the first aspect of the invention, the generation of a source port for the time bin of a IPFIX data sample comprises the grouping module being configured to: randomly select a source port of an IPFIX record that has a collection time that falls within the time bin.

With regard to the first aspect of the invention, the generation of a destination port for the time bin of a IPFIX data sample comprises the grouping module being configured to: randomly select a destination port of an IPFIX record that has a collection time that falls within the time bin.

With regard to the first aspect of the invention, the generation of a packet for the time bin of a IPFIX data sample comprises the grouping module being configured to: sum all the packets of IPFIX records that have a collection time that falls within the time bin.

With regard to the first aspect of the invention, the generation of a reverse packet for the time bin of a IPFIX data sample comprises the grouping module being configured to: sum all the reverse packets of IPFIX records that have a collection time that falls within the time bin.

With regard to the first aspect of the invention, the data augmentation process comprises the grouping module being configured to: for each destination IP address associated with an IPFIX training data sample: select IPFIX training data samples from the plurality of IPFIX training data samples that have the similar destination IP address; apply random circular time shifts to the time bins of the selected IPFIX data sample; merge and reorder the time-shifted time bins to form a time-shifted IPFIX data sample; merge all the time-shifted IPFIX data samples into a consolidated data sample whereby the consolidated data sample forms part of the training dataset.

With regard to the first aspect of the invention, the grouping module is further configured to: randomly select time bins from the consolidated data sample; and randomly perturb values in these selected time bins.

With regard to the first aspect of the invention, the grouping module is further configured to: randomly select time bins from the consolidated data sample; and randomly introduce random noise to values in these selected time bins.

With regard to the first aspect of the invention, the labels of the training datasets comprise identification labels and enumeration labels generated during the data augmentation process.

According to a second aspect of the invention, a system for autonomously fingerprinting and enumerating Internet of Thing (IoT) devices based on Network Address Translated (NAT-ed) network traffic of the IoT devices that has been collected over a time period is disclosed, the system comprising: a grouping module configured to: retrieve Domain Name System (DNS) records from the NAT-ed network traffic; group the DNS records based on a particular time period and source internet protocol (IP) addresses, and retrieve domains associated with the DNS records; remove, from the groups, domains not found in a database of domains, whereby the database of domains are generated based on DNS records of known IoT devices; a Term Frequency-Inverse Document Frequency (TF-IDF) vectorizer coupled to the grouping module, the TF-IDF vectorizer configured to: generate IoT DNS signatures based on DNS records of known IoT devices, wherein the IoT DNS signatures comprise a list of TF-IDF vectors and a list of normalized TF-IDF vectors, whereby distances between each of the TF-IDF vectors in the list of TF-IDF vectors exceed a first predefined similarity threshold and distances between each of the N-TF-IDF vectors in the list of N-TF-IDF vectors exceed a second predefined similarity threshold; and compute TF-IDF vectors $\vec{Y}$ for the group of domains obtained from the grouping module, an IoT detector and enumerator module coupled to the trained TF-IDF vectorizer, the IoT detector and enumerator module configured to: compute constituents of the TF-IDF vectors $\vec{Y}$ based on the TF-IDF vectors $\vec{Y}$ and a Moore-Penrose pseudo inverse matrix of the IoT DNS signatures, whereby the constituents of the TF-IDF vectors $\vec{Y}$ represent identities of IoT devices and counts of the IoT devices that generated the NAT-ed network traffic.

With regard to the second aspect of the invention, the IoT detector and enumerator module is further configured to: cluster, using 1-D hierarchical clustering, the constituents of the TF-IDF vectors $\vec{Y}$; filter away clusters having a maximum value less than a predefined threshold; obtain identities of IoT devices and counts of the IoT devices that generated the NAT-ed network traffic based on constituents of the TF-IDF vectors $\vec{Y}$ contained in remaining clusters.

With regard to the second aspect of the invention, the Moore-Penrose pseudo inverse matrix of the IoT DNS signatures is defined by $[\hat{S}^T\hat{S}]^{-1}\hat{S}^T$, where $\hat{S}$ is defined by [ $\vec{S}_1 \vec{S}_2 \ldots \vec{D}_1 \vec{D}_2 \ldots \vec{D}_m$], where $\vec{S}_1, \vec{S}_2, \ldots, \vec{S}_n$ are TF-IDF vectors obtained from the IoT DNS signatures, $\vec{D}_1, \vec{D}_2, \ldots, \vec{D}_m$ are visitation counts to domains in the IoT DNS signatures, and $\hat{S}^T$ is the transpose of $\hat{S}$.

With regard to the second aspect of the invention, the constituents of the TF-IDF vectors $\vec{Y}$ are defined by $[\hat{S}^T\hat{S}]^{-1}\hat{S}^T\vec{Y}$ where TF-IDF vectors, $\vec{Y}$, are defined as $$\vec{Y} = a_1\vec{S}_1 + a_2\vec{S}_2 + \ldots + a_n\vec{S}_n + d_1\vec{D}_1 + d_2\vec{D}_2 + \ldots d_m\vec{D}_m$$

where $\vec{S}_1, \vec{S}_2, \ldots, \vec{S}_n$ are TF-IDF vectors obtained from the IoT DNS signatures, an are the coefficients of the TF-IDF vectors obtained from the IoT DNS signatures, $\vec{D}_1, \vec{D}_2, \ldots, \vec{D}_m$ are visitation counts to domains in the IoT DNS signatures, do are the coefficients of the visitation counts to domains in the IoT DNS signatures, and $\hat{S}^T$ is the transpose of $\hat{S}$.

With regard to the second aspect of the invention, the generation of the IoT DNS signatures by the TF-IDF vectorizer comprises the TF-IDF vectorizer being configured to: obtain the DNS records of known IoT devices; group the DNS records based on a particular time period (e.g. hour, day, etc.) and source internet protocol (IP) addresses, and retrieve domains associated with these grouped DNS records; apply a TF-IDF method to the group of domains to generate the IoT DNS signatures comprising a list of TF-IDF vectors and a list of normalized TF-IDF vectors, whereby distances between each of the TF-IDF vectors in the list of TF-IDF vectors exceed the first predefined similarity threshold and distances between each of the N-TF-IDF vectors in the list of N-TF-IDF vectors exceed the second predefined similarity threshold.

BRIEF DESCRIPTION OF THE DRAWINGS

The above and other problems are solved by features and advantages of a system and method in accordance with the present invention described in the detailed description and shown in the following drawings.

DETAILED DESCRIPTION

This invention relates to a system and method for detecting the presence of Internet of Things (IoTs) from network traffic that has undergone a Network Address Translation (NAT) process, regardless of whether the network traffic comprises IP Flow Information Export (IPFIX) type of traffic or Domain Name System (DNS) type of traffic. Such a capability is crucial as the adoption rate of IoTs have increased exponentially over the past few years.

In order to protect IoTs from cyber-attacks, one would first have to understand what type of IoTs are being used, and how many/how widely used these IoTs are. Once the IoT landscape has been defined, cyber defenders may then dedicate resources to identify and subsequently address vulnerabilities that may be in these IoTs.

Hence, it is of upmost importance that the system can identify IoTs behind NAT-ed traffic (I.e., traffic observed from a single router, behind which may have multiple IoTs and user), and enumerate them to obtain an idea how many of such devices are found in the NAT-ed traffic.

The present invention will now be described in detail with reference to several embodiments thereof as illustrated in the accompanying drawings. In the following description, numerous specific features are set forth in order to provide a thorough understanding of the embodiments of the present invention. It will be apparent, however, to one skilled in the art, that embodiments may be realised without some or all of the specific features. Such embodiments should also fall within the scope of the current invention. Further, certain process steps and/or structures in the following may not have been described in detail and the reader will be referred to a corresponding citation so as to not obscure the present invention unnecessarily.

Further, one skilled in the art will recognize that many functional units in this description have been labelled as modules throughout the specification. The person skilled in the art will also recognize that a module may be implemented as circuits, logic chips or any sort of discrete component, and multiple modules may be combined into a single module or divided into sub-modules as required without departing from the invention. Still further, one skilled in the art will also recognize that a module may be implemented in software which may then be executed by a variety of processors. In embodiments of the invention, a module may also comprise computer instructions or executable code that may instruct a computer processor to carry out a sequence of events based on instructions received. The choice of the implementation of the modules is left as a design choice to a person skilled in the art and does not limit the scope of this invention in any way.

Figure 1:
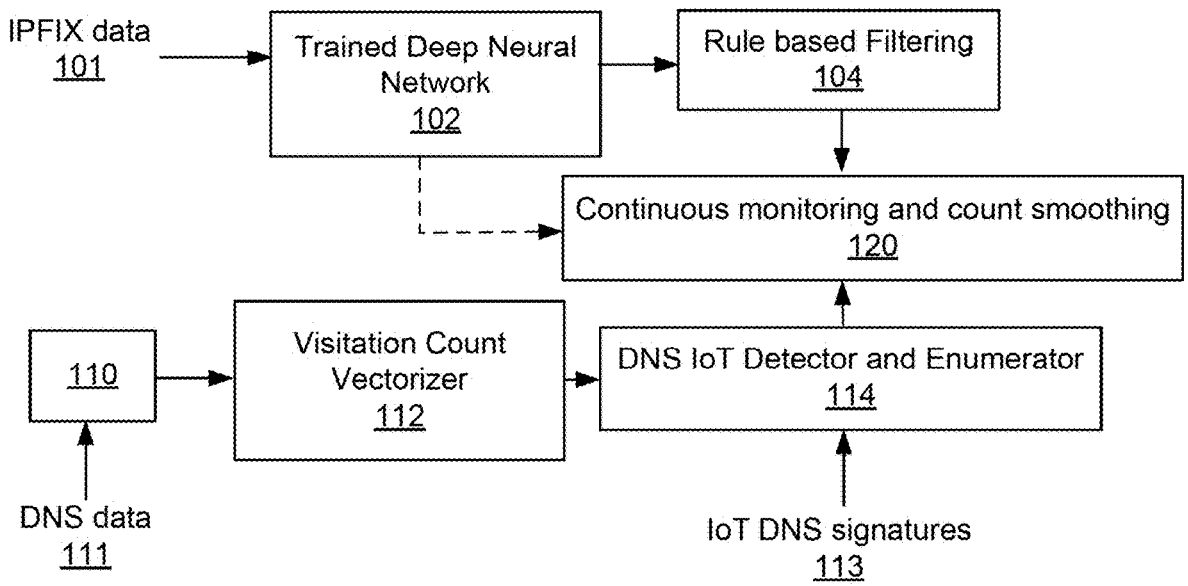
FIG. 1 illustrating block diagram of modules that may be used to implement the system for autonomously fingerprinting and enumerating Internet of Thing (IoT) devices in accordance with embodiments of the invention.

FIG. 1 illustrates a block diagram of modules that may be used to implement the system for autonomously fingerprinting and enumerating Internet of Thing (IoT) devices in accordance with embodiments of the invention. In general, during operation, processed IPFIX data 101 is first provided to a trained deep neural network module 102. The output from module 102 may then be provided to rule-based filtering module 104. The output from module 104 is then provided to monitoring and smoothing module 120 which presents to users a raw and smoothed count of each of the IoT devices over a period of time to prevent spurious detections from perturbating the instantaneous counts presented to the user.

Alternatively, in another embodiment of the invention, the output from module 102 may be provided directly to smoothing module 120. Simultaneously, DNS data 111 is provided to module 110 which processes it and then passes the processed DNS data to visitation count vectorizer module 112. The output from module 112 together with pre-collected IoT DNS signatures 113 are then provided to detector and enumerator module 114. The output from module 114 is then provided to continuous monitoring and count smoothing module 120.

In operation, before deep neural network 102 and vectorizer 112 may be trained, and before IoT DNS signatures 113 are collected, a dataset of IP Flow Information Export (IPFIX) and Domain Name System (DNS) traffic flows have to be collected for a set of IoT devices over a period of time. These IoTs will be connected to a computer network which communicatively connects, through wired or wireless means, the IoTs to the Internet. Further, each of these IoTs which are configured to operate in a "standby mode" will be triggered to receive and/or send data periodically each week through the Internet.

During a predetermined period (e.g., at least more than 1 week), each of the IoT's traffic flows comprising IPFIX and DNS traffic will be monitored, collected, and stored in a database server. As the stored data comprises data that has not undergone a Network Address Translation (NAT) process, that is the data comprises un-NATed data or un-NATed network traffic, this stored data is then processed and then used as the initial training datasets for deep neural network 102 and vectorizer 112 and for generating IoT DNS signatures 113.

Training of a Deep Neural Network for Classification of IPFIX Data

Figure 2:
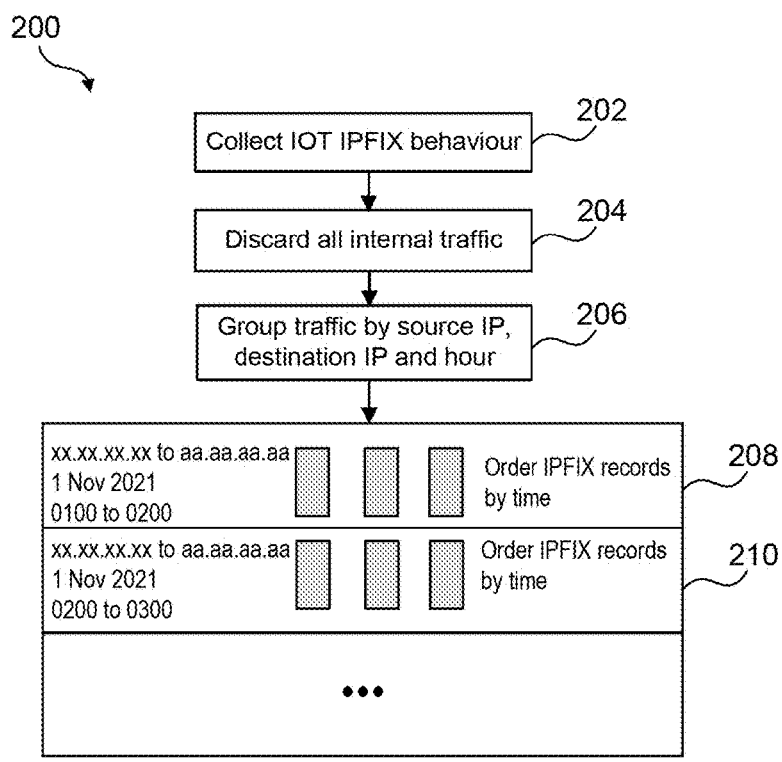
FIG. 2 illustrating a flow diagram representative of the grouping of IPFIX flow data into source IP, destination IP and time in accordance with embodiments of the invention.

The first step in the generation of the IPFIX training dataset (to train neural network 102) is to group the IPFIX data records—which were obtained as described above. The process for grouping the IPFIX data records is illustrated in FIG. 2 as process 200. These steps and processes may be performed by module 102 or a grouping module communicatively (not shown) coupled to module 102. Process 200 begins at step 202 where process 200 retrieves all the IPFIX traffic flow data from the database server. At step 204, process 200 then discards all IPFIX data with source and destination IPs which are both contained within the computer network, i.e., internal data traffic.

The remaining IPFIX traffic flow data which comprise flows stemming from internal IP addresses directed towards external IP addresses are then grouped, at step 206, according to their occurrence time (i.e., the record's timestamp and in an embodiment of the invention, the hour of the record's occurrence), source IP (which comprises the IP address of an originating IoT), and destination IP (which comprises an IP that the IoT is addressing).

The grouped data or records are then ordered according to the time the IPFIX data was collected. Exemplary illustrations of these ordered groups are shown as groups 208 and 210 where these two groups have identical source and destination IPs and the data/records within each of these groups are ordered according to the time each data/record was collected, i.e., group 208's records were collected between 0100-0200 on 1 Nov. 2021 while group 210's records were collected between 0200-0300 on 1 Nov. 2021.

In summary, the IPFIX records in each of the groups are formed by grouping the data or records into groups (illustrated as groups 208 and 210) based on source IP, destination IP and collection times of the IPFIX records in these groups, whereby each group represents a time period, which is set to be an hour in this example. The IPFIX records in each of the groups are then ordered chronologically according to collection times of the IPFIX records.

The protocol, Octet, reverse Octet, source ports, destination ports, packets and reverse packets features are then extracted from the data/records found within each of these groups. The seven (7) features extracted from each group are then used to fill up time bins within a data sample or data structure comprising of a plurality of time bins. In this embodiment of the invention, each of the time bins which comprise the 7 extracted features each represents a 10-second interval of an hour. One skilled in the art will recognize that each time bin may comprise other time intervals without departing from this invention.

The following extraction, aggregation, and binning methodology 302 as described in steps (a)-(g) below are applied to generate the 7 features for each of the time bins in the data sample.

a) Protocol: If more than 1 IPFIX record maps to the same time bin, one of the protocols of the IPFIX records will be randomly selected.
b) Octet: If more than 1 IPFIX record maps to the same time bin, all the Octets in this time bin are summed up.
c) Reverse If more than 1 IPFIX record maps to the same time bin, all the reverse Octet: Octets are summed up.
d) Source If more than 1 IPFIX record maps to the same time bin, one of the source ports: ports of the IPFIX records will be randomly selected.
e) Destination If more than 1 IPFIX record maps to the same time bin, one of the ports: destination ports of the IPFIX records will be randomly selected.
f) Packets: If more than 1 IPFIX record maps to the same time bin, all the packets are summed up.
g) Reverse If more than 1 IPFIX record maps to the same time bin, all the packets are Packets: summed up.

Figure 3:
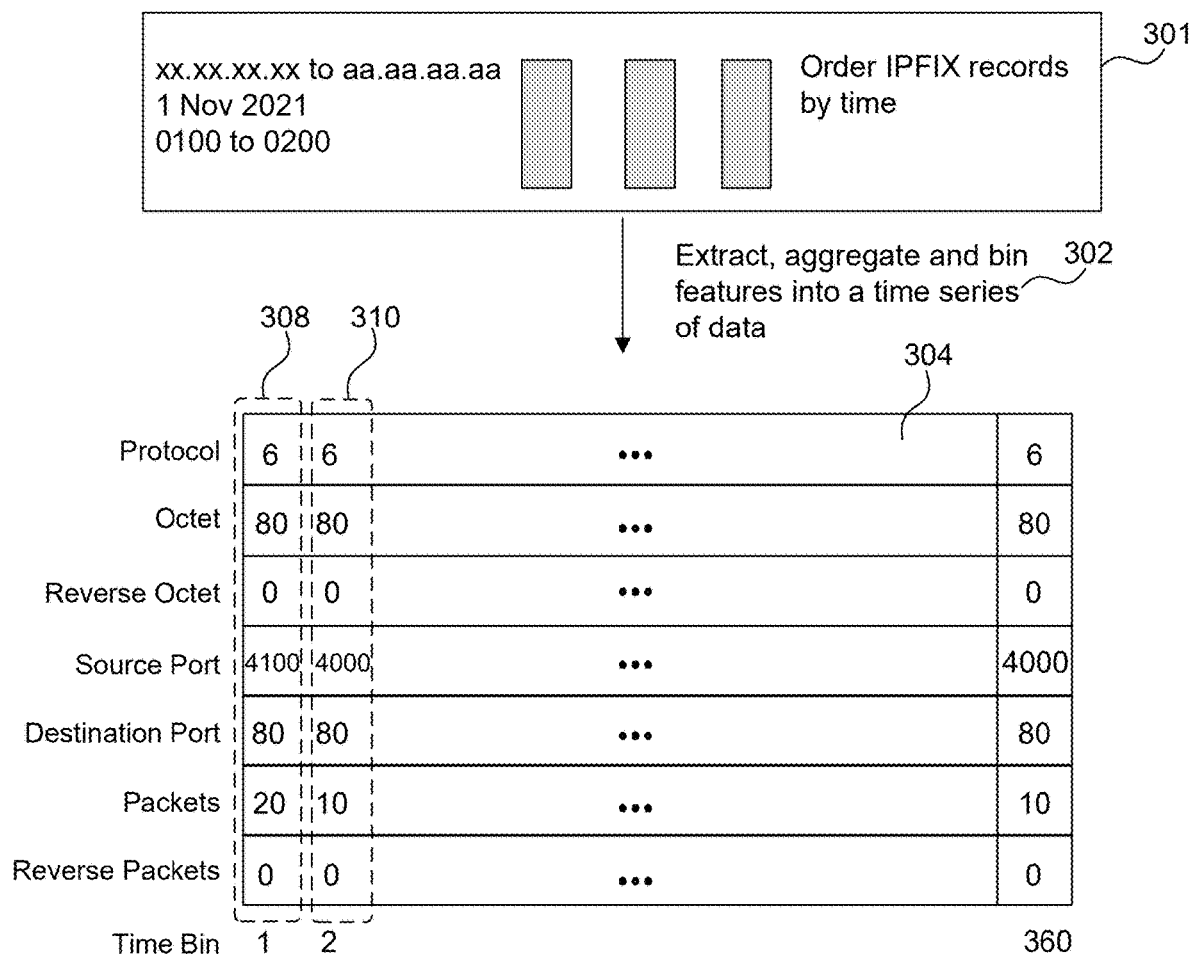
FIG. 3 illustrating a flow diagram representative of how a 7-feature time series can be derived from each group of IPFIX records, in accordance with embodiments of the invention.

An exemplary data sample 304 of the time series of the 7 features (discretized according to the time bins) that has been populated using the extraction, aggregation, and binning method 302 as described in steps (a)-(g) above, is illustrated in FIG. 3 whereby method 302 was applied to a group of IPFIX records 301 that have been ordered chronologically.

In this example, the $1^{st}$ time bin 308 comprises the following 7 features: "Protocol: 6, Octet: 80, Reverse Octet: 0, Source Port: 4100, Destination Port: 80, Packets: 20, Reverse Packets: 0" and the $2^{nd}$ time bin 310 comprises the following 7 features: "Protocol: 6, Octet: 80, Reverse Octet: 0, Source Port: 4000, Destination Port: 80, Packets: 10, Reverse Packets: 0". In time series 304, it is shown that there is a total of 360-time bins as there are 360 10-second intervals in an hour.

By the end of the process 302, a data sample comprising the 7 feature time series that are each made up of time bins for each of the 7 features (as generated for data sample 304) would have been generated for each of the groups of chronologically ordered IPFIX records resulting in a plurality of data samples. These data samples form the features on which a binary classifier cum counter will be trained to identify the presence of IoT and enumerate them.

The above process is then repeated for all the groups of data (e.g., 208, 210) so that each group of data is eventually converted to a corresponding data sample (e.g. 304). These data samples can be stored in a central database server.

With the data samples now stored in a central database server, the next step would be to generate a plurality of augmented data samples, each having the same data structure as the original data sample stored in the central database server (i.e., the augmented data samples would also be made up of the same 7 feature time series), but augmented to represent IPFIX traffic flow that have been NAT-ed. Each of these augmented data samples comprise the same features as the original 7 feature time series data structure that have undergone a data augmentation process. In embodiments of the invention, this process may be carried out by the grouping module communicatively (not shown) coupled to module 102 or provided within module 102.

Figure 4:
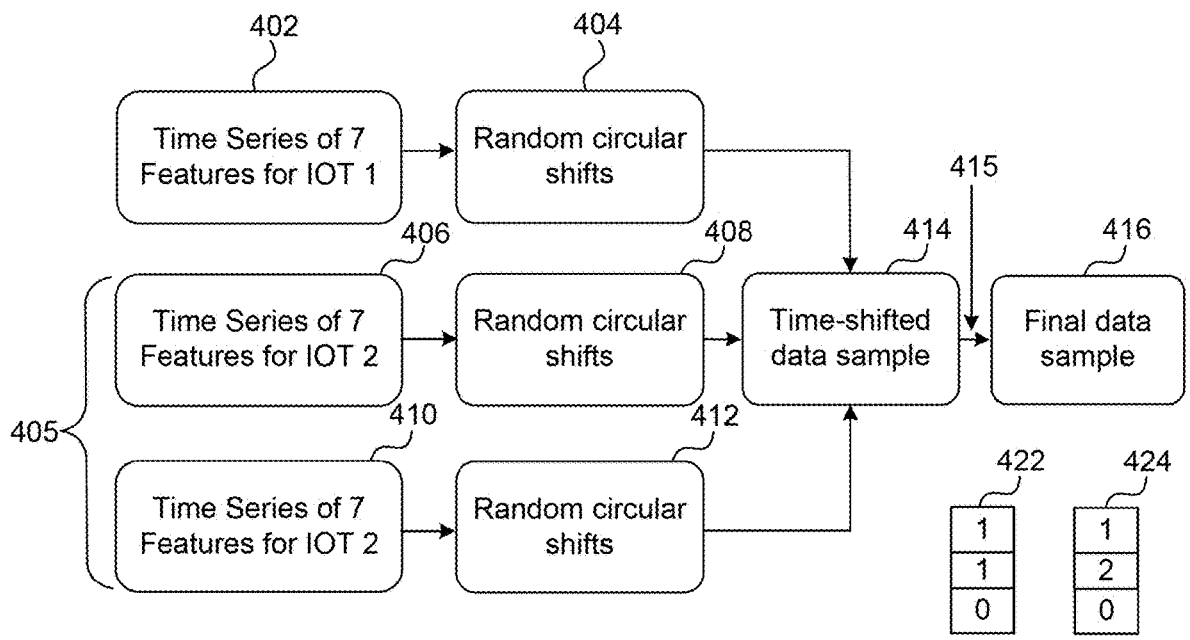
FIG. 4 illustrating a flow diagram representative of augmentations of the 7-feature time series in accordance with embodiments of the invention.

During the data augmentation process, a data sample associated with one of the IoTs from the database server is first retrieved. In the example illustrated in FIG. 4, this data sample is assumed to be obtained from a first IoT, i.e., IoT 1, and is stored as record 402.

In this embodiment, up to 100 other data samples that have the same destination IP address as IoT 1 are then sampled from the database server, depicted as group of records 405. One skilled in the art will recognize that any number of data samples may be utilized at this step without departing from this invention.

Random circular time shifts (comprising the steps of shifting the various time series by the same random amount) are then applied to each of the data samples, e.g., record 402 and group of records 405. This is done to accommodate the event whereby each IoT begins transmitting data at different times of the hour. For example, in the example illustrated in FIG. 3, the $1^{st}$ time bin may be shifted by 70 secs to an $8^{th}$ time bin and etc.

The shifted time series of 7 features in each of the data samples are then merged, via steps (a)-(g) described above (i.e., methodology 302) to form a time-shifted, combined data sample. One skilled in the art will recognize that the step of applying the random circular time shifts to the time bins and the step of sampling up to 100 data samples are interchangeable.

In embodiments of the invention, certain time bins in the combined, time-shifted data sample may be randomly selected, and the values of the contents in these randomly selected time bins may be randomly perturbed to accommodate the case of non-IoT traffic within the NAT-ed data.

In another embodiment of the invention, random noise may be added to each of the time bins to produce the final data to also accommodate the case of non-IoT traffic within the NAT-ed data.

As the data is collated into the combined, time-shifted data samples, two types of labels are generated as well: the identification label which indicates the identity of the various IoTs that contributed to the traffic contained in the combined, time-shifted data sample; and the enumerator label which indicates the number of the identified IoTs that contributed to the traffic contained in the time-shifted data sample. These labels are easily obtained because the process of selecting record 402 and group of records 405 are known to the system and may be obtained as part of the data augmentation process. The process above is then repeated until all the original data samples in the database server have undergone the data augmentation process. These augmented data samples (i.e., combined time-shifted data samples) may either be generated and collected prior to the model training process to form a consolidated static database of augmented data samples to be used as the training dataset, or generated on the fly to provide an infinitely large dataset due to the randomness of the data augmentation process.

The following example is set out to better illustrate the data augmentation process described above. In this example, a data sample is assumed to be obtained from a first IoT, i.e., IoT 1, and is stored as record 402. Up to 100 other data samples that have the same destination IP address as IoT 1 were sampled from the database server and stored as a group data samples 405.

Data samples 406 and 410 are then randomly selected from the group of data samples 405. It can be seen that both data samples 406 and 410 were coincidentally found to be sampled from IoT 2. One skilled in the art will recognize that data samples 406 or 410 may be derived from IPFIX data generated from any other IoTs without departing from this invention as long as they communicate with the same destination IP. For each of the data samples 402, 406 and 410, random circular time shifts are then conducted on each of them to produce time shifted time series 404, 408, and 412.

After that, time-shifted records 404, 408 and 412 are all merged according to methodology 302 (i.e. steps (a)-(g) above) to form augmented data sample 414. In other embodiments of the invention, random noise 415 may be added to the various time bins and the resulting outcome is provided as final data 416 else augmented data sample 414 may be used as final data 416. As the final data 416 is produced, an identification label 422 and an enumerator label 424 are generated as well for data 416. In this example, as the final data contained traffic from IoT 1 and 2 only, and as this example comprised of three records, identification label 422 will show "1, 1, 0" and enumerator label 424 will show "1, 2, 0"— as one IoT 1 and two IoT 2s contributed traffic to the final data 416.

The steps above are repeated until all the data samples in the original database server have undergone at least one round of the data augmentation process. All the generated time-shifted data samples, e.g., the plurality of final data 416, are then gathered to form a consolidated database.

By the end of the steps above, the consolidated database would comprise augmented data samples, each containing multiple IoTs, random circular shifts and random numbers of each IoT. The contents of the consolidated database form the simulated NAT-ed data and for each of such data samples, the associated labels in terms of the IoT present in the simulated NAT-ed data and their associated counts are also obtained. In other embodiments, this data augmentation process can also be done on the fly, without the need to store the augmented data in a consolidated database.

Thus far, the steps above have described how features may be extracted from not just a single IPFIX record, but over multiple IPFIX records, to obtain a 7 feature time series of the typical network flow features present in typical NETFLOW or IPFIX records. The contents of either the original non-augmented data sample comprising the original non-augmented time series of 7 features or the augmented data sample comprising the simulated NAT-ed time series of 7 features may then be used to train a 2-headed neural network, whereby one head is configured to produce a first vector showing the probability that a particular IoT is present in the traffic while the other head is configured to generate a second vector that shows the count of the particular IoT. In other embodiments, the neural network may be trained using just augmented data generated on the fly, resulting in an infinite dataset, without the need for storing the samples in a finite database store.

It should be noted that if one were to use these features and training labels to train a neural network via conventional loss functions (e.g., sigmoid cross entropy loss function), one would not be able to stabilize the training. This is simply because IoT traffic is very varied, and some data would be indistinguishable from other IoT traffic; it is common to have a situation whereby a particular traffic behaviour A labelled with IoT device A could be displayed by IoT device B. However, in the collected data, traffic behaviour A would not be labelled with IoT device B as one of its labels. Training a model directly on such data typically leads to unstable training. As a result, those skilled in the art have invested a lot of time and effort to extract clean, defining "signatures" or "profiles" to manually characterize the traffic behaviour associated with an IOT device. Such an approach is inefficient.

Instead of viewing such traffic as noisy or unclassifiable, such traffic may instead be viewed as a dataset with corrupted labels.

Typical neural networks are trained via binary cross entropy loss to classify whether a particular object is present or not. It should be noted that module 102 is not trained using this training process. Instead, module 102 treats the training labels as noisy labels. As mentioned above, not all the collected traffic are unique to a particular IoT. Hence, in the example given above, a model that predicts the presence of IoT device B would be wrongly penalized in this instance, when in fact, it is correct, resulting in unstable training. To address this, module 102 is trained in a manner that does not completely trust the labels (i.e., treating the training label as a noisy label).

In particular, the bi-tempered cross entropy loss or bi-tempered logistic loss may be used to train the model in module 102. In this way, the neural network automatically classifies data that it finds hard to train on as noisy data and reduces the impact of such data on the loss function, stabilizing learning and reducing confusion automatically without a single hand-crafted feature/rule. The other head is then trained via a typical mean squared error loss function.

Figure 5:
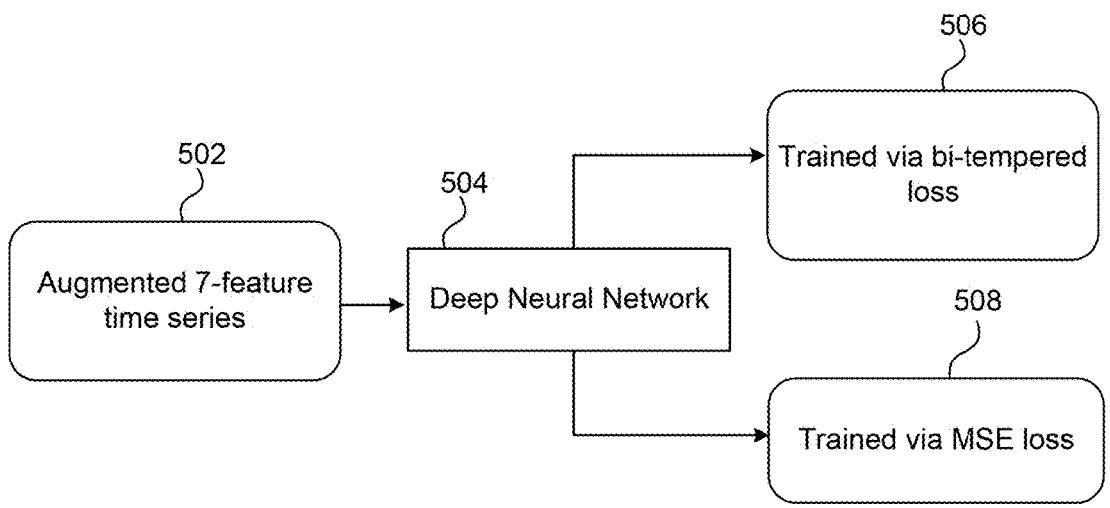
FIG. 5 illustrating a block diagram of a neural network that may be used to process IPFIX flow data in accordance with embodiments of the invention.

In accordance with an embodiment of the invention, the training of the model in module 102 is illustrated in FIG. 5. The time series 502 that has been augmented (as obtained from the consolidated database) is first provided to deep neural network 504. Deep neural network 504 may comprise of, but are not limited to, deep learning networks such as a convolutional neural network (CNN), a recurrent neural network (RNN) or transformer neural network architectures. Deep neural network 504 is then configured to produce two output vectors. The first output vector 506 corresponds to a multi-class classification output that is activated by a tempered-sigmoid output that is configured to flag the presence of multiple IoT devices. It should be noted that this output vector 506 is trained using a bi-tempered logistic loss function. This has 2 implications:

First, instead of using the typical sigmoid activation function (or equivalently a 2-class softmax activation function) as the neural network's final activation function to indicate whether a particular IoT type is present, a tempered version is used instead. The typical softmax activation function where $a_i$ are the weights output by the neural network prior to the softmax activation is set out below. This is the typical activation function used by most state-of-the-art neural networks and is implemented natively in most deep learning packages.

$$\hat{y}_i = \frac{\exp(\hat{a}_i)}{\sum_{j=1}^{k} \exp(\hat{a}_j)} = \exp\left(\hat{a}_i - \log\sum_{j=1}^{k} \exp(\hat{a}_j)\right)$$

In the above equation, $\hat{y}_i$ indicates the probability that an IoT exists in the simulated NAT-ed traffic data sample and the â's refers to the logits output by the neural network. As it will be declared whether an IoT type is present in the traffic or not, k, will be set as 2. This means that $\hat{a}_1$ indicates the logits for whether the particular IoT type is present in the traffic and $\hat{a}_2$ indicates the logits for whether the particular IoT type is not present in the traffic. The above equation is repeated for all known IoT types in the training dataset, allowing the $\hat{y}_i$'s to be obtained for each IoT, each indicating the probability of whether the particular IoT is present in the traffic.

Unlike the state-of-the-art neural networks, the model in module 102 is trained using the tempered softmax function or a bi-tempered logistic loss function as shown below, where it is parameterised by a temperature term, $t_2$.

$\hat{y}_i = \exp_{t_2}(\hat{a}_i - \lambda_{t_2}(\hat{a}))$, where $\lambda_{t_2}(\hat{a}) \in \mathbb{R}$ is s.t. $\sum_{j=1}^{k} \exp_{t_2}(\hat{a}_j - \lambda_{t_2}(\hat{a})) = 1$ In the above equation $t_2$ represents the temperature term and $t_2 > 1$ must be satisfied. The $\exp_{t_2}$ function describes the tempered softmax function, with an associated temperature of $t_2$. As before, k indicates the number of possible outcomes. In this embodiment, as before, it is to be decided whether a given IoT device is present in the traffic or not (i.e., 2 outcomes). Hence k=2. Finally, $\lambda_{t_2}(\hat{a})$ is a normalizing variable to ensure that the probabilities of the 2 outcomes sum to 1 even after being tempered by temperature term $t_2$ It should be noted that the above function has to be implemented in a custom manner and the challenging part is ensuring that the exponentials sum to 1 even after being perturbed by a certain temperature.

Secondly, instead of using the typical cross entropy loss function, a tempered version is used instead. The typical cross entropy loss function implemented in most deep learning packages is defined as:

$$-\sum_{i=1}^{k} y_i \cdot \log \hat{y}_i$$

In the above equation, $y_i$ is the actual probability of a particular IoT being in the traffic or not (since k=2) and $\hat{y}_i$ is the model's output probability of whether a particular IoT is in the traffic or not.

Instead of utilizing the function above, the model in module 102 is trained using the following bi-tempered cross entropy loss function, parameterised by a temperature term, $t_1$.

$$\sum_{i=1}^{k} \left( y_i \left( \log_{t_1} y_i - (\log_{t_1} \hat{y}_i) - \frac{1}{2 - t_1} \left( y_i^{2-t_1} - \hat{y}_i^{2-t_1} \right) \right) \right)$$

Similar to before, k indicates the number of output possibilities. In this case, as it is to be decided whether a particular IoT is in the observed traffic or not, the value of k is set to be, k=2. $y_i$ is the actual probability of a particular IoT being in the traffic or not (since k=2) and $\hat{y}_i$ is the model's output probability of whether a particular IoT is in the traffic or not. $t_1$ is the temperature term and can be arbitrarily set as $0 \leq t_1 < 1$.

The second output vector 508 corresponds to a linearly activated output layer which provides a count on the number of devices in the observed traffic. The second output vector 508 is trained using a mean squared error (MSE) loss function which attempts to predict the number of each IoT device that contributed to the traffic.

Deployment of Trained Neural Network Model on IPFIX Data

Once the neural network in module 102 has been trained, it may then be used as follows. A data sample comprising a time series of 7 features is extracted from the observed traffic, i.e., IPFIX data 101 (as shown in FIG. 1) and is provided to trained neural network 102.

In other words, the collected IPFIX network traffic 101 (comprising IPFIX traffic flows stemming from internal IP addresses directed towards external IP addresses) are pre-processed as described in the previous sections into the data sample format whereby the data sample comprises a time series of 7 features all of which are derived from the IPFIX traffic flows.

The database comprising the time series of 7 features associated with the network traffic, which are discretized by 10-second intervals (i.e., time bins), are passed to the trained two-headed neural network 102. Trained two-headed neural network 102 then carries out per device tempered binary classification to determine whether a particular IoT exists in the traffic and also carries out per device enumeration of the IoT should the model deem them to exist in the observed traffic.

For example, if only 3 IoT devices are to be identified, the output from a first head of the trained two-headed neural network 102 would be two sets of (3×1) vectors. The first vector as shown below in Table 1 is obtained from a model 102 that had been trained via the bi-tempered logistic loss function described above. Under the assumption that a detection threshold has been defined as 0.7, only IoT device 1 and IoT device 3 would have been deemed to be detected in the traffic.

Table 1

| |
|---|
| 0.76 |
| 0.31 |
| 0.98 |

The second vector produced by the second head of the trained two-headed neural network 102 would be as illustrated in Table 2 below. Given that the first vector only predicted the presence of IoT devices 1 and 3, trained model 102's conclusion would be to round up the vectors below using a ceiling function, for IoT devices 1 and 3, while setting the rest to 0. Specifically, it would conclude that there are 5 units of IoT device 1 and 1 unit of IoT device 3 in the traffic, based on the input 7 feature time series.

Table 2

| |
|---|
| 4.60 |
| 10.3 |
| 0.30 |

By the end of this step, trained neural network would have identified the type and number of IoTs present in the traffic. In order to increase the precision of the output, the following additional rules may be applied to the output from trained neural network 102 by rule-based filtering module 104:

a. Based on the model detections, the data is grouped by destination IP and detected device whereby,
    i. For each of these groups (i.e., destination IP, device group) the number of occurrences is tabulated.
    ii. If the number of occurrences exceed a threshold, referred to as the "minimum number of devices connects per IP", that IP is identified as a possible destination of interest for that particular device.
    iii. The steps above are repeated for each device and by the end, a list of possible destination IPs that each IoT device may connect to is obtained. It is useful to note that each IoT device would have its own list of possible destination IPs.
    iv. For each IoT device, all detections with destination IPs not in the possible list of destination IPs are removed.
  b. For the remaining records, the data are then grouped by destination IP and detected device.
    i. For each group, a count is carried out and only destination IPs with counts beyond the 95th percentile is kept.
    ii. These destination IPs form the list of high confidence destination IPs for each IOT device.
    iii. For each IOT device, all detections with destination IPs not within the associated high confidence destination IP list are subsequently removed.
  c. Finally, all detections with source IPs in the list of high confidence destination IP list are also removed.

Generation of an IoT DNS Signature Database Using a Vectorizer Model

All the IoT devices that are to be fingerprinted are firstly connected to a single network in a "transparent manner" such that all data transmitted and received by these IoT devices are visible to the network's administrator and/or module 110 (shown in FIG. 1). In this embodiment, each IP address in this network (excluding the router's IP) corresponds to a unique IoT device in the network.

As known to one skilled in the art, IoTs may be configured to make DNS queries to specific domains at specific times. For example, IoT device-1 may be configured to query a domain "33.net.abcd.nat" at a specific time each day or IoT device-1 may be configured to query multiple domains throughout the day. A count-based method depending on the domains visited by the IoT device may then be utilized to extract a feature vector for each IoT for each day.

In this embodiment, the Term Frequency-Inverse Document Frequency (TF-IDF) method was applied to extract a feature vector for each IoT for each day. Thus, a feature vector may be created using the TF-IDF method for each IoT and for the day that the DNS data was collected for. These feature vectors may then be collected to form a signature database for the various IoTs.

In operation, all the DNS records 111 in this network are first collected. It is useful to note that DNS records 111 in this network would comprise all the DNS queries made by the various IoT devices in the network over a time period. Records 111 are then provided to module 110. Module 110 is then configured to group the DNS records 111 by source IP (i.e., by IoT) and then by time (e.g., by day). As part of this process, module 110 arranges the entire list of domains according to each IoT's IP address and the time or day that the domain was queried by the IoT. By the end of this process, module 110 would have generated a list of chronologically arranged queried domains for each IoT device for a particular time window, which in this embodiment comprises one day.

Figure 6:
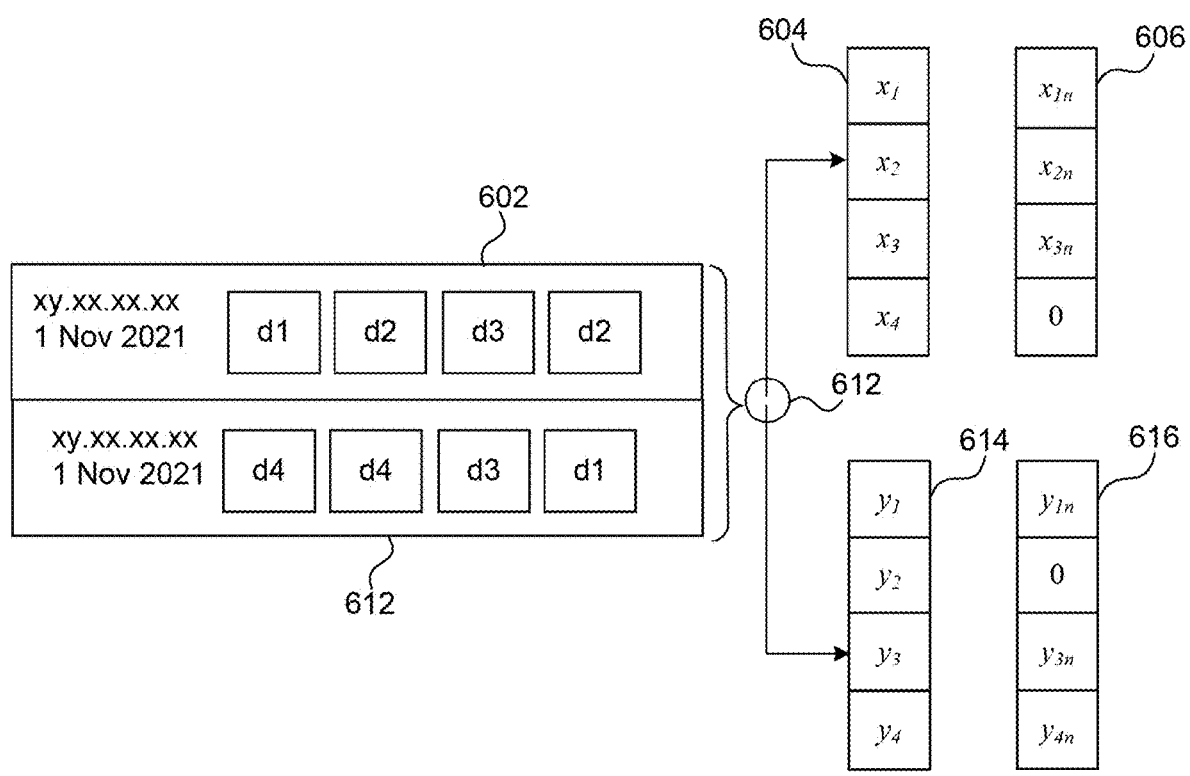
FIG. 6 illustrating the grouping of IoTs' DNS queries into source IP addresses and time, to subsequently produce count-based vectors, in accordance with embodiments of the invention.

Exemplary lists of chronologically arranged queried domains for two IoT devices, i.e., having unique source IP addresses xx.xx.xx.xx and xy.xx.xx.xx, for a particular day, e.g. 1 Nov. 2021, are illustrated in FIG. 6. In particular, IoT with source IP address xx.xx.xx.xx has list 602 while IoT with source IP address xy.xx.xx.xx has list 612. In lists 602 and 612, d1 to d4 correspond to DNS queries to domains 1 to 4 respectively.

In embodiments of the invention, vectorizer 112 (as shown in FIG. 1) will then utilize the TF-IDF method to generate a database of IoT DNS signatures based on the list of domains, where each list corresponds to the various domains queried by a particular IoT within a particular time window. Details relating to the exact workings of the TF-IDF method is omitted for brevity as this method is known to one skilled in the art.

When vectorizer 112 is applied to the list of domains, it produces a TF-IDF vector for each list of domains. This TF-IDF vector is then normalized to produce a normalised TF-IDF (N-TF-IDF) vector. Initially, for each IoT device, two empty lists will be first initialized: a first list which is used to store N-TF-IDF vectors and a second list to store TF-IDF vectors. Vectorizer 112, then iteratively goes through the various lists of domains associated with each IoT device and time window to produce the N-TF-IDF and TF-IDF vectors.

In an embodiment of the invention, the current N-TF-IDF and TF-IDF vectors will be added to their respective IoT's lists if the lists are empty. If the lists aren't empty, the distance between the current N-TF-IDF/TF-IDF vector and all the other N-TF-IDF/TF-IDF vectors contained in the respective lists will be computed. If the minimum distance exceeds a particular similarity threshold both the current N-TF-IDF vectors and/or the TF-IDF vectors will be added to the respective lists corresponding to that particular IoT device, else it will be omitted. Once vectorizer 112 has processed the lists for all the IoTs, two lists of vectors for each IoT device will be produced and these lists are used to form IoT DNS signatures 113. It should be noted that the vectors in these two lists define the characteristics and signatures of the IoT devices.

The process above is best explained with reference to the example illustrated in FIGS. 6 and 7. Two sets of domains, each of which corresponds to a particular IoT and time window are provided to vectorizer 112. Vectorizer 112 is then used to transform each of these domain lists (which are each associated with each IoT device and time window) into a normalized TF-IDF vector and an unnormalized TF-IDF vector.

In the embodiment illustrated in FIG. 6, TF-IDF vectorizer 112 converts each of these sets into normalized vector 606 and unnormalized vector 604 for list 602, and normalized vector 616 and unnormalized vector 614 for list 612.

Once the TF-IDF vector and the N-TF-IDF vector have been generated, vectorizer 112 then populates a DNS signature database for each IoT device based on the distance between each of the TF-IDF vectors (and/or the N-TF-IDF vectors) of the IoT device. An exemplary population of a signature database for IoT Device A (e.g. an IoT device with the source IP xx.xx.xx.xx) is illustrated in FIG. 7. In the embodiment illustrated in FIG. 7, the vectors used were the normalized TF-IDF (N-TF-IDF) vectors however, one skilled in the art will recognize that TF-IDF vectors may also be used.

Figure 7:
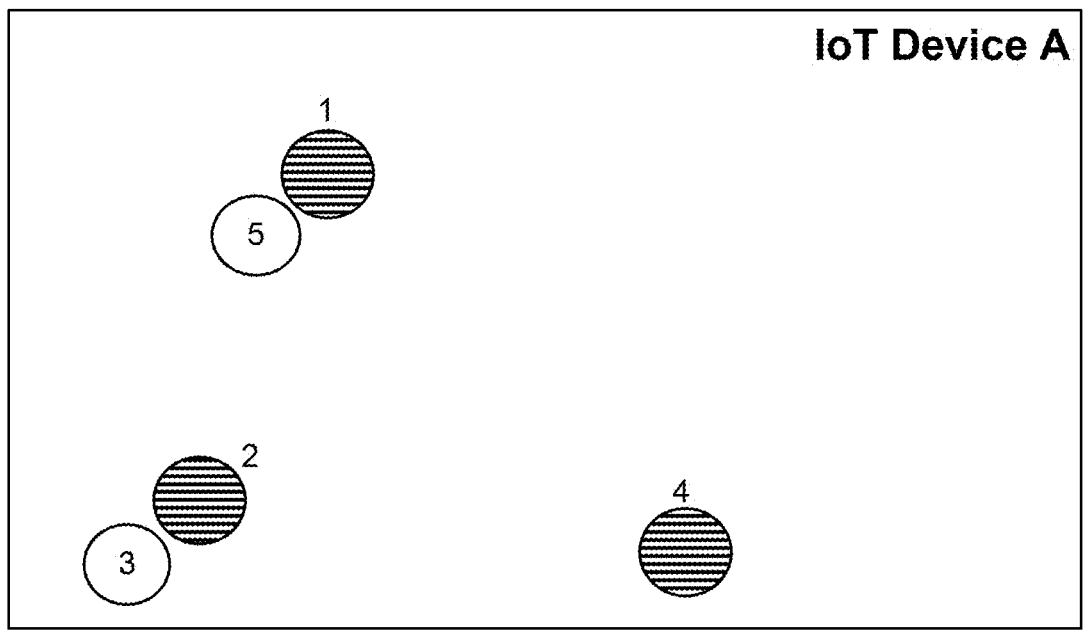
FIG. 7 illustrating plots of TF-IDF vectors to show how TF-IDF vectors are selected to form the signature dataset for each IOT device in accordance with embodiments of the invention.

For the given example in FIG. 7, for IoT device A, vectorizer 112 would iterate through the five (5) N-TF-IDF vectors (produced by vectorizer 112) associated with it. With N-TF-IDF vector 1, vectorizer 112 would save that in the signature dataset as the signature dataset would be initially empty. For vector 2, since it is located far away from vector 1, it would also be saved, as the minimum distance between vectors 1 and 2 exceeds a particular similarity threshold. For vector 3, as it is closer to vector 2, vector 3 would thus be discarded as the minimum distance between vectors 2 and 3 is less than the previously defined similarity threshold. As vector 4 is far from both vectors 1 and 2, it would be saved while vector 5 is located close to vector 1 and thus would be discarded, leaving N-TF-IDF vectors 1, 2 and 4 (i.e., the shaded circles in FIG. 7). This means that the N-TF-IDF vectors 1, 2 and 4, and the TF-IDF vectors 1, 2 and 4 will be added to the respective lists.

By the end of the above process, vectorizer 112 would have a list of vectors that define the characteristic and signature of each IoT device. These lists of vectors are then stored in IoT DNS signatures 113.

Deployment of Trained Vectorizer Model on DNS Data

Once vectorizer 112 has produced IoT DNS Signatures 113 based on a training dataset of DNS records of known IoT devices, vectorizer 112 may be used with IoT DNS Signatures 113 and DNS IoT Detector and Enumerator 114 to detect IoTs and count the number of IoTs present in the NAT-ed traffic.

In operation, with reference to FIG. 1, it can be seen that all the DNS records (e.g., DNS data 111) in a network are first collected and provided to module 110. It should be noted that in operation, the DNS records would comprise all the DNS queries made by the various users, devices and IoT devices sharing the same source IP address, not just IoT devices. Module 110 is then configured to group the DNS records 111 by their source IP addresses. Module 110 then segregates the DNS records in each of the groups into sets based on querying times of the DNS records in these groups, whereby each set represents a time period (e.g., by each hour or by each day).

In other words, each set would relate to a unique source IP address and a particular time period. In an embodiment of the invention, within each set, module 110 may then arrange the list of domains chronologically, according to the time that the domain was queried by the particular IoT. By the end of this process, module 110 would have generated sets of chronologically arranged queried domains for each IoT device for particular time periods or days, e.g., sets 602 or 612.

For each of the domains associated with a given source IP and time period in each set, module 110 will filter away all the domains that are not found in TF-IDF vectorizer 112's vocabulary of domains. Note that this vocabulary of domains was created by vectorizer 112 based on the training dataset of DNS records of known IoT devices and is used internally within a typical TF-IDF vectorizer to keep track of a particular domain's document frequency.

Next, TF-IDF vectorizer 112 then computes TF-IDF vectors for the remaining domains in each of the sets. The TF-IDF vectors are then provided to DNS IoT Detector and Enumerator 114.

However, in order to cater for NAT-ed data that may be contained within DNS data 111, DNS IoT Detector and Enumerator 114 will not make use of conventional vector similarity metrics to process the received TF-IDF vectors. Instead, DNS IoT Detector and Enumerator 114 will view the problem of processing these vectors as an algebraic problem.

In particular, it is assumed that the TF-IDF vector of NAT-ed DNS traffic would be a linear sum of all the constituent devices behind the NAT, be it human interaction with the Internet via computers, IOT devices, etc. Based on this assumption, the problem to be solved by DNS IoT Detector and Enumerator 114 then comprises a signal decomposition problem where DNS IoT Detector and Enumerator 114 is required to break down each of the NAT-ed TF-IDF vectors into the constituents of the TF-IDF vectors in our database of IoT DNS signatures 113.

One way to do this is to use the Moore-Penrose pseudo inverse matrix to obtain a closed form solution to provide an estimate of the IoT devices present in the NAT and their associated number. Mathematically, the steps to obtain the estimate of IoT devices present are as follows:

$\vec{Y}$ is first defined as the observed TF-IDF vector of the NAT-ed traffic, $\vec{S_1}, \vec{S_2}, \ldots, \vec{S_n}$ are defined as all the TF-IDF vectors (or signatures) obtained from the step of generating the IoT DNS signatures as described above, $\vec{D_1}, \vec{D_2}, \ldots, \vec{D_m}$ are defined as all the one hot vectors where each coefficient represents a single visitation count to each of the domains in the IoT DNS signatures.

As a result, the observed TF-IDF vector of the NAT-ed traffic, $\vec{Y}$, can be obtained as follows:

$$\vec{Y} = a_1 \vec{S_1} + a_2 \vec{S_2} + \ldots + a_n \vec{S_n} + d_1 \vec{D_1} + d_2 \vec{D_2} + d_m \vec{D_m} \quad \text{equation (1)}$$

The objective is then to solve this equation to obtain the values for the a's and d's coefficients. Equation (1) above may then be rearranged to:

$$\vec{Y} = [\vec{S_1} \ \vec{S_2} \ \ldots \ \vec{D_1} \ \vec{D_2} \ \ldots \vec{D_m}] \begin{bmatrix} a_1 \\ a_2 \\ \ldots \\ a_n \\ d_1 \\ d_2 \\ \ldots \\ d_m \end{bmatrix}$$

which can then be simplified to: $\vec{Y} = \hat{S}\hat{A}$

To solve for $\hat{A}$, the following step is performed:

$\hat{S}^T \vec{Y} = \hat{S}^T \hat{S} \hat{A}$ $[\hat{S}^T \hat{S}]^{-1} \hat{S}^T \vec{Y} = \hat{A}$ where the term $[\hat{S}^T \hat{S}]^{-1} \hat{S}^T$ comprises the Moore-Penrose pseudo inverse matrix and ST is the transpose of $\hat{S}$.

Thus, by taking the pseudo inverse matrix of the all the vectors (or signatures) obtained from the training stage described above ($[\hat{S}^T \hat{S}]^{-1} \hat{S}^T$), and by multiplying them by the TF-IDF vectors of the current traffic ($\vec{Y}$), we can immediately get an approximate solution to the various coefficients, $a_1, a_2, d_1, \ldots, d_m$ (or constituents of the TF-IDF vectors).

The above steps describe the use of the Moore Penrose inverse matrix to find potential counts of the number of IoT devices in the observed DNS records 111. Once the matrix is solved, a single numerical vector would be obtained with each element of the vector corresponding to the coefficients of equation (1).

Note that each IoT device may exhibit more than one DNS signature as illustrated in FIG. 7. Thus, $S_1$ and $S_2$ could, for example, be signatures of the same IoT device. This means that coefficients $a_1$ and $a_2$ are also associated with the same IoT device. However, as DNS IoT Detector and Enumerator 114 is aware of the device that corresponds to each of the a's, DNS IoT Detector and Enumerator 114 may effectively sum up the relevant coefficients for each device to approximate the number of devices present in the NAT-ed traffic.

In traffic that is predominantly IoT traffic, it would be easy for DNS IoT Detector and Enumerator 114 to detect the IoT. However, if a human is also querying those domains, the traffic becomes too noisy, and DNS IoT Detector and Enumerator 114 would not be able to detect IoTs in such noisy IoT traffic. What this means is that the coefficients of the d's in equation (1) would be larger than the coefficients of the a's in equations.

To address this, DNS IoT Detector and Enumerator 114 also uses clustering together with thresholding methods.

Given the elements of A (i.e., the coefficients $a_n$ and $d_m$), DNS IoT Detector and Enumerator 114 will conduct 1-D hierarchical clustering on these elements. DNS IoT Detector and Enumerator 114 then filters away all clusters whose maximum value is less than a preliminary threshold of 0.01. This means that at least 1% of a particular device's signature must be exhibited. All other clusters with coefficients that are below this preliminary threshold are also filtered away. Devices associated with the remaining clusters are then declared to exist in the traffic. This clustering and thresholding method assists DNS IoT Detector and Enumerator 114 to come up with a dynamic threshold that can overcome the situation where the "d" coefficients overwhelm the "a" coefficients.

Experimental Results

When trained neural network 102 was applied to IPFIX data, it was found that trained neural network 102 was able to classify most of the devices with a high F1 score using just the conventional features in IPFIX traffic, without requiring any additional logging features to be used. In fact, out of the 26 devices, it was able to get a high F1 score of >0.8 for 19 of the devices. When evaluating its ability to count the number of devices in the traffic, we note that a mean error of about 10% from the original number of devices in the traffic occurred. Further, it should be noted that all these performances were easily obtained without the need for laborious and arduous feature engineering/extraction process. The entire process was automated using advanced loss functions to train the neural network automatically. Further, it was found that the system is scalable and may be used with very large network traffic. Such analysis is extremely useful in gaining insights into the IoT landscape of large network traffic so cyber defenders know which IOT devices to place emphasis on to maximize user protection.

Figure 8:
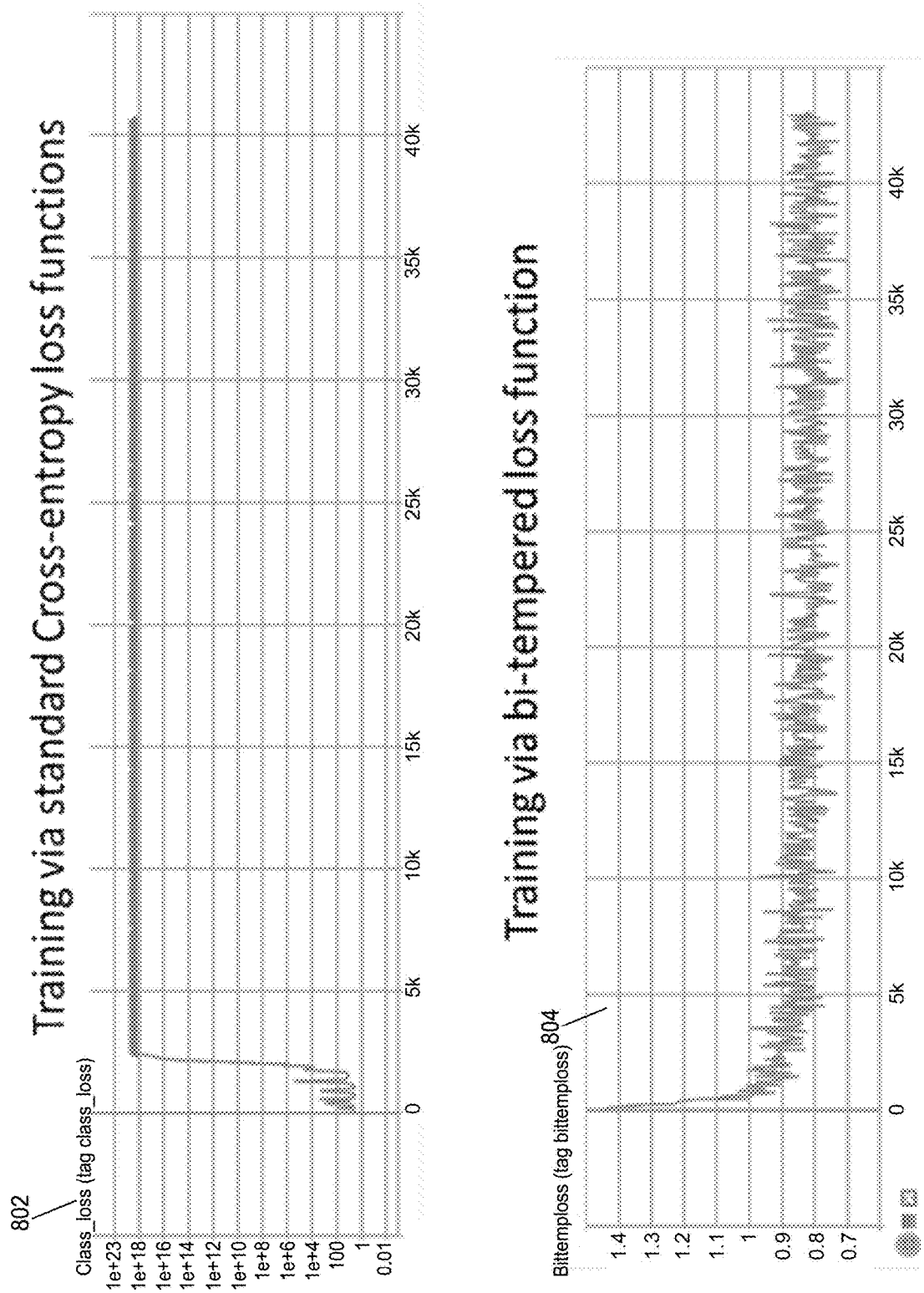
FIG. 8 illustrating plots of cross-entropy loss function and bi-tempered loss function as a function of time.

It should be noted that if neural network 102 were to be trained using the conventional cross entropy loss functions, the training of the neural network would be extremely unstable. This is illustrated in FIG. 8. Plot 802 shows that when the conventional cross entropy loss functions were used to train neural network 102, this would lead to NaNs occurring throughout the training process. Plot 804 shows that the use of the bi-tempered loss function removes this problem completely and allows neural network 102 to be trained without errors occurring.

Figure 9:
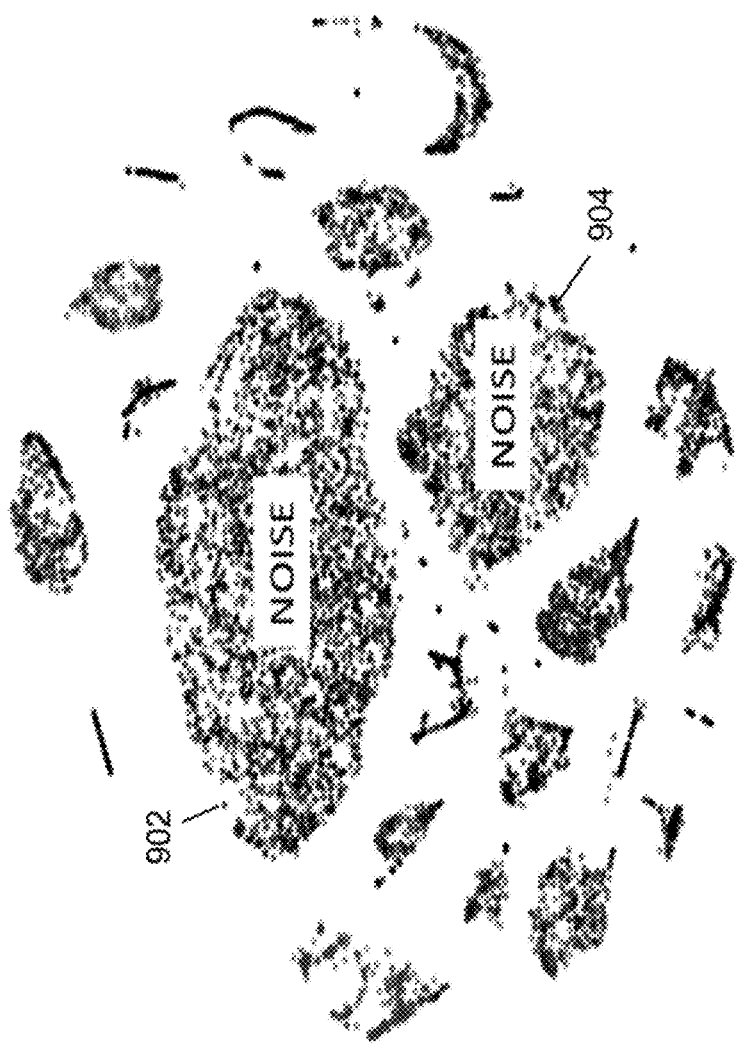
FIG. 9 illustrating t-Distributed Stochastic Neighbour Embedding (t-SNE) plots of one of the neural network's intermediate layers.
Figure 10:
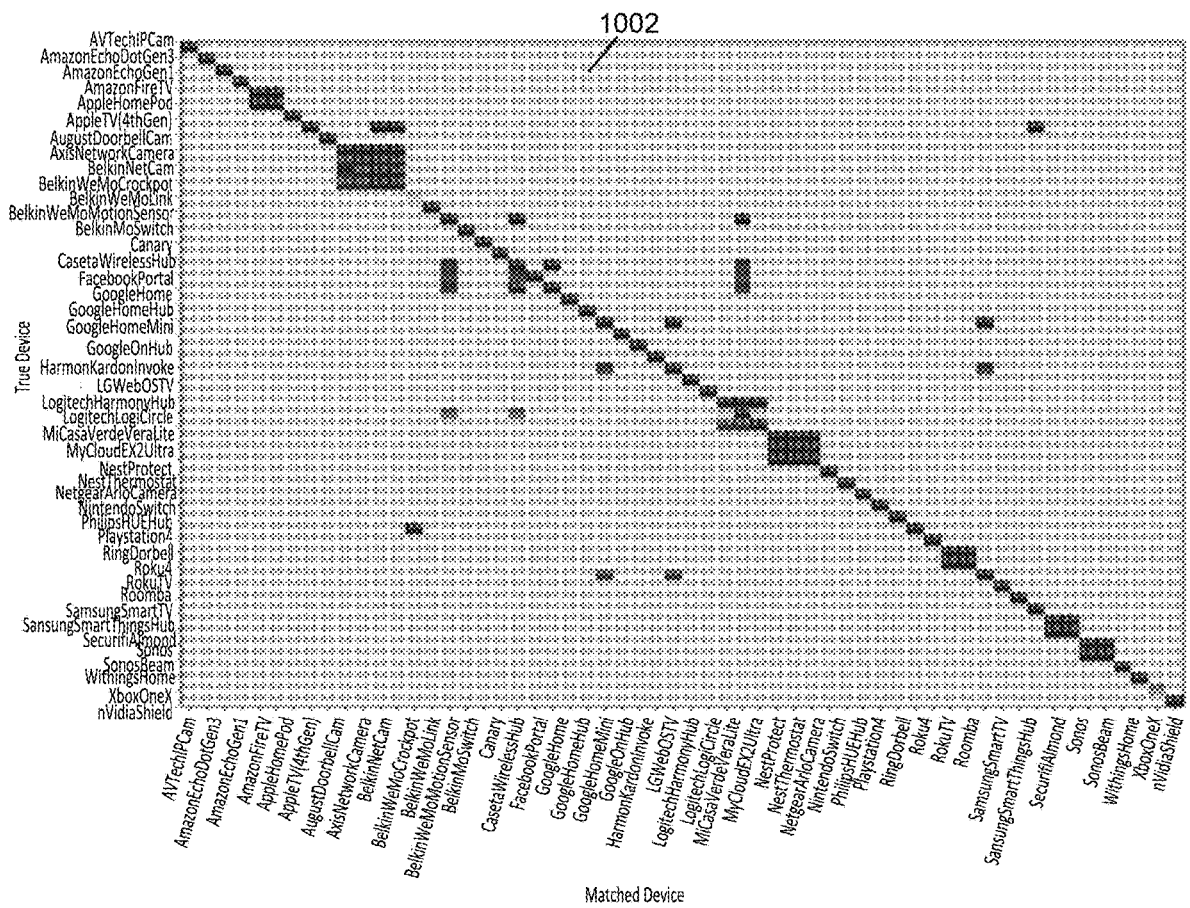
FIG. 10 illustrating confusion matrixes plotted based on a state-of-the-art method by Perdisci and another based on the method in accordance with embodiments of the invention.
Figure 10:
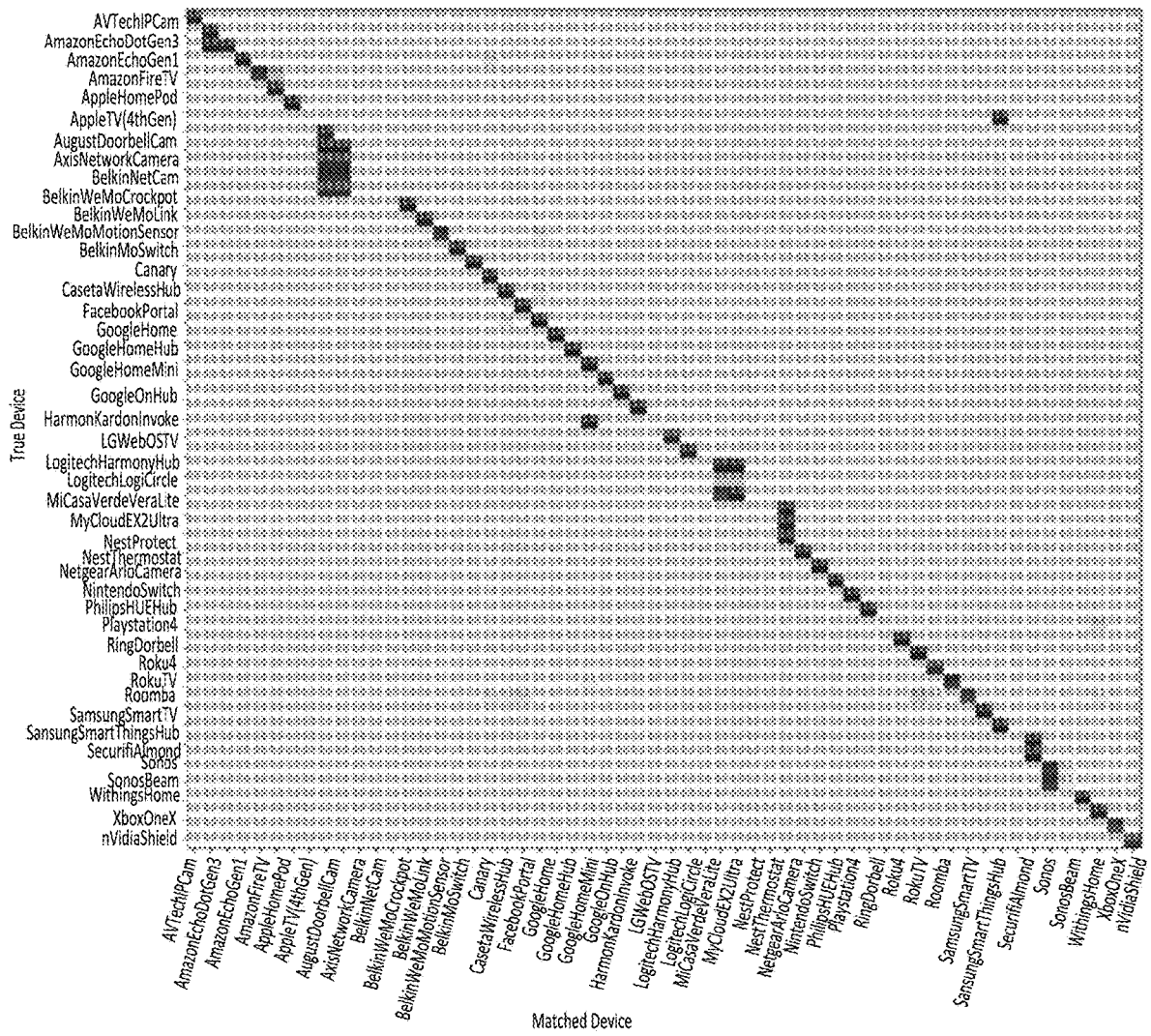

A clustering process was also conducted on some of the intermediate layers of neural network 102 and as shown in FIG. 9, it can be seen that they can be clustered well. FIG. 9 illustrates a TSNE plot of one of the neural network's intermediate layers for each data point in the dataset. It was found that each individual IoT device can be well clustered. This plot also shows data points that display behaviours inconsistent with defining characteristics of a particular IoT are all placed in large blobs 902 and 904. This clearly showcases the algorithm's ability to automatically extract defining characteristics and not let noisy characteristics (in this example viewed as corrupted labels) affect its decision boundaries, which was the source of the NaN errors if cross entropy loss was used.

When DNS IoT Detector and Enumerator 114 was used on a set of DNS records, it was found that that DNS IoT Detector and Enumerator 114 was able to produce a result that was more precise by >5% when compared to existing methodologies (i.e., Perdiscii's method). The existing methodology was plotted as plot 1002 while the result obtained from DNS IoT Detector and Enumerator 114 was plotted as plot 1004. Furthermore, DNS IoT Detector and Enumerator 114 was shown to produce a confusion matrix (at plot 1004) that has much fewer off diagonal elements, indicating that there was generally less "confusion".

Figure 11:
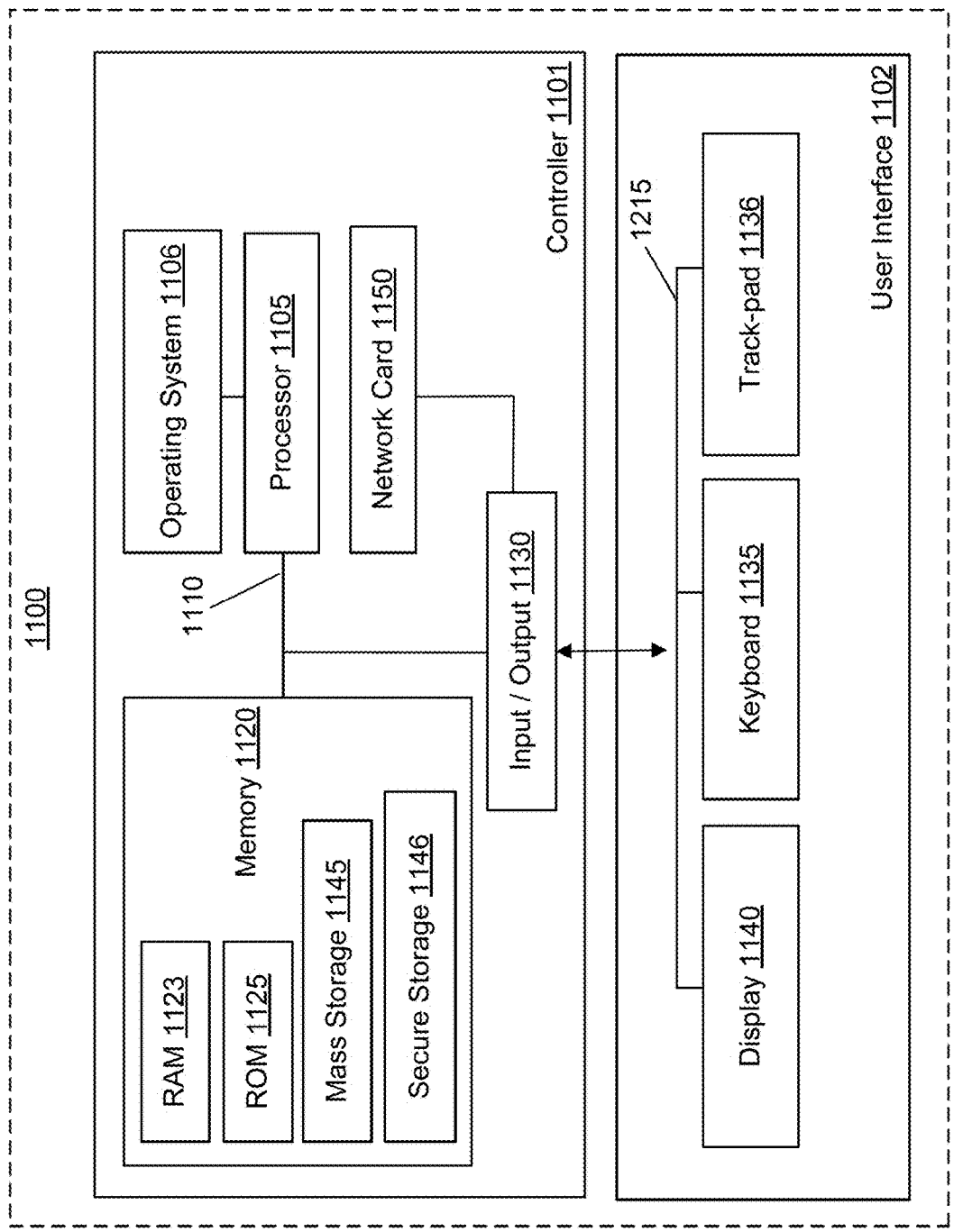
FIG. 11 illustrating a block diagram representative of processing systems providing embodiments in accordance with embodiments of the invention.

In accordance with embodiments of the invention, a block diagram representative of components of processing system 1100 that may be provided within modules 102, 104, 120, 110, 112, 114 and any other modules in the system (as shown in any of the figures) for implementing embodiments in accordance with embodiments of the invention is illustrated in FIG. 11. One skilled in the art will recognize that the exact configuration of each processing system provided within these modules may be different and the exact configuration of processing system 1100 may vary and FIG. 11 is provided by way of example only.

In embodiments of the invention, each of the modules in system 1100 may comprise controller 1101 and user interface 1102. User interface 1102 is arranged to enable manual interactions between a user and each of these modules as required and for this purpose includes the input/output components required for the user to enter instructions to provide updates to each of these modules. A person skilled in the art will recognize that components of user interface 1102 may vary from embodiment to embodiment but will typically include one or more of display 1140, keyboard 1135 and trackpad 1136.

Controller 1101 is in data communication with user interface 1102 via bus 1115 and includes memory 1120, processor 1105 mounted on a circuit board that processes instructions and data for performing the method of this embodiment, an operating system 1106, an input/output (I/O) interface 1130 for communicating with user interface 1102 and a communications interface, in this embodiment in the form of a network card 1150. Network card 1150 may, for example, be utilized to send data from these modules via a wired or wireless network to other processing devices or to receive data via the wired or wireless network. Wireless networks that may be utilized by network card 1150 include, but are not limited to, Wireless-Fidelity (Wi-Fi), Bluetooth, Near Field Communication (NFC), cellular networks, satellite networks, telecommunication networks, Wide Area Networks (WAN) etc.

Memory 1120 and operating system 1106 are in data communication with CPU 1105 via bus 1110. The memory components include both volatile and non-volatile memory and more than one of each type of memory, including Random Access Memory (RAM) 1120, Read Only Memory (ROM) 1125 and a mass storage device 1145, the last comprising one or more solid-state drives (SSDs). Memory 1120 also includes secure storage 1146 for securely storing secret keys, or private keys. One skilled in the art will recognize that the memory components described above comprise non-transitory computer-readable media and shall be taken to comprise all computer-readable media except for a transitory, propagating signal. Typically, the instructions are stored as program code in the memory components but can also be hardwired. Memory 1120 may include a kernel and/or programming modules such as a software application that may be stored in either volatile or non-volatile memory.

Herein the term "processor" is used to refer generically to any device or component that can process such instructions and may include: a microprocessor, microcontroller, programmable logic device or other computational device. That is, processor 1105 may be provided by any suitable logic circuitry for receiving inputs, processing them in accordance with instructions stored in memory and generating outputs (for example to the memory components or on display 1140). In this embodiment, processor 1105 may be a single core or multi-core processor with memory addressable space. In one example, processor 1105 may be multi-core, comprising—for example—an 8 core CPU. In another example, it could be a cluster of CPU cores operating in parallel to accelerate computations.

Numerous other changes, substitutions, variations, and modifications may be ascertained by the skilled in the art and it is intended that the present invention encompass all such changes, substitutions, variations and modifications as falling within the scope of the appended claims.

The invention claimed is:

1. A system for autonomously fingerprinting and enumerating Internet of Thing (IoT) devices based on Network Address Translated (NAT-ed) network traffic of the IoT devices that has been collected over a time period, the system comprising:
   memory storing instructions; and
   one or more processors coupled to the memory and configured to process the stored instructions to:
      retrieve Internet protocol (IP) Flow Information Export (IPFIX) records from the NAT-ed network traffic;
      group the IPFIX records into groups according to collection time, source IP address, and destination IP address;
      order the IPFIX records in each of the groups chronologically according to collection times of the IPFIX records;
      generate a plurality of IPFIX data samples, whereby each IPFIX data sample is generated from one of the groups of the chronologically ordered IPFIX records, and whereby each IPFIX data sample comprises a plurality of discrete time series comprising a protocol, an octet, a reverse octet, a source port, a destination port, a packet and a reverse packet associated with IPFIX records having the collection times that fall within a particular time bin of the plurality of discrete time series;
      determine, using a first head of a trained two-headed neural network, identities of the IoT devices that generated the NAT-ed network traffic by carrying out per device tempered binary classification on the plurality of IPFIX data samples; and
      enumerate, using a second head of the trained two-headed neural network, each of the IoT devices identified by the first head of the trained two-headed neural network,
   whereby the first head of the trained two-headed neural network is trained using a loss model that treats labels from a training dataset as noisy labels and the second head of the trained two-headed neural network is trained using a mean squared error (MSE) loss function, and
   whereby the training dataset used to train the trained two-headed neural network comprises a plurality of IPFIX training data samples generated based on unNAT-ed network traffic and comprises a plurality of the IPFIX training data samples that have undergone a data augmentation process.

2. The system according to claim 1, whereby the loss model that treats the labels from the training dataset as the noisy labels comprises a bi-tempered cross entropy loss function that is parameterised by a temperature term, $t_1$, wherein the bi-tempered cross entropy loss function is defined as:

$$\sum (i-1)^\wedge k \equiv$$
$$(\log\_(t\_1) - (\log\_(t\_1)) - 1/(2 - t\_1)(y\_i^\wedge(2 - t\_1) - y^\wedge\_i^\wedge(2 - t\_1))).$$

3. The system according to claim 1, whereby the loss model that treats the labels from the training dataset as the noisy labels comprises a bi-tempered softmax function that is parameterised by a temperature term, $t_2$, wherein the bi-tempered softmax function is defined as:

$$\hat{y}_i = \exp_{t_2}(\hat{a}_i - \lambda_{t_2}(\hat{a})), \text{ where } \lambda_{t_2}(\hat{a}) \in \mathbb{R} \text{ is } s.t. \Sigma_{j=1}^k \exp_{t_2}(\hat{a}_j - \lambda_{t_2}(\hat{a})) = 1.$$

4. The system according to claim 1, wherein the one or more processors are further configured to process the stored instructions to generate a protocol for the particular time bin of an IPFIX data sample by:
   randomly selecting a protocol of an IPFIX record that has a collection time that falls within the particular time bin.

5. The system according to claim 1 wherein the one or more processors are further configured to process the stored instructions to generate the reverse octet for the particular time bin of an IPFIX data sample by:
   summing all octets of the IPFIX records that have the collection times that fall within the particular time bin.

6. The system according to claim 1 wherein the one or more processors are further configured to process the stored instructions to generate the reverse octet for the particular time bin of an IPFIX data sample by:
   summing all reverse octets of the IPFIX records that have the collection times that fall within the particular time bin.

7. The system according to claim 1 wherein the one or more processors are further configured to process the stored instructions to generate the source port for the particular time bin of an IPFIX data sample by:
   randomly selecting a source port of an IPFIX record that has a collection time that falls within the particular time bin.

8. The system according to claim 1 wherein the one or more processors are further configured to process the stored instructions to generate the destination port for the particular time bin of an IPFIX data sample by:
   randomly selecting a destination port of an IPFIX record that has a collection time that falls within the particular time bin.

9. The system according to claim 1 wherein the one or more processors are further configured to process the stored instructions to generate the packet for the particular time bin of an IPFIX data sample by:
  summing all packets of the IPFIX records that have the collection times that fall within the particular time bin.

10. The system according to claim 1 wherein the one or more processors are further configured to process the stored instructions to generate the reverse packet for the particular time bin of an IPFIX data sample by:
  summing all reverse packets of the IPFIX records that have the collection times that fall within the time particular bin.

11. The system according to claim 1, wherein the data augmentation process comprises:
  for each destination IP address associated with an IPFIX training data sample:
    selecting IPFIX training data samples from the plurality of IPFIX training data samples that have similar destination IP addresses;
    applying random circular time shifts to the time bins of the selected IPFIX training data samples;
    merging and reordering the time-shifted time bins to form time-shifted IPFIX training data samples;
    merging all the time-shifted IPFIX training data samples into a consolidated data sample whereby the consolidated data sample forms part of the training dataset.

12. The system according to claim 11 wherein the one or more processors are further configured to process the stored instructions to:
  randomly select the time bins from the consolidated data sample; and
  randomly perturb values in the selected time bins.

13. The system according to claim 11 wherein the one or more processors are further configured to process the stored instructions to:
  randomly select the time bins from the consolidated data sample; and
  randomly introduce random noise to values in the selected time bins.

14. The system according to claim 1, wherein the labels of the training dataset comprise identification labels and enumeration labels generated during the data augmentation process.

* * * * *